United States Patent
Shu et al.

(10) Patent No.: US 11,615,000 B2
(45) Date of Patent: Mar. 28, 2023

(54) METHOD AND BACKUP SERVER FOR PROCESSING EXPIRED BACKUPS

(71) Applicant: HUAWEI TECHNOLOGIES CO., LTD., Guangdong (CN)

(72) Inventors: Zhi Shu, Shenzhen (CN); Jie Hou, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 255 days.

(21) Appl. No.: 16/908,923

(22) Filed: Jun. 23, 2020

(65) Prior Publication Data

US 2020/0319976 A1 Oct. 8, 2020

Related U.S. Application Data

(63) Continuation of application No. PCT/CN2017/118689, filed on Dec. 26, 2017.

(51) Int. Cl.
*G06F 11/00* (2006.01)
*G06F 11/14* (2006.01)

(52) U.S. Cl.
CPC ...... *G06F 11/1453* (2013.01); *G06F 11/1469* (2013.01); *G06F 2201/80* (2013.01); *G06F 2201/84* (2013.01)

(58) Field of Classification Search
CPC .......... G06F 11/1453; G06F 11/1469; G06F 2201/80; G06F 2201/84; G06F 11/1458; G06F 11/1448
See application file for complete search history.

(56) References Cited

U.S. PATENT DOCUMENTS

| 7,694,088 | B1 | 4/2010 | Bromley et al. |
|---|---|---|---|
| 2013/0173548 | A1 | 7/2013 | Haustein et al. |
| 2016/0092311 | A1* | 3/2016 | Bushman ............ G06F 11/1461 707/646 |
| 2016/0274975 | A1 | 9/2016 | Chen et al. |
| 2017/0123935 | A1 | 5/2017 | Pandit et al. |
| 2017/0168903 | A1* | 6/2017 | Dornemann ........ G06F 11/2038 |

FOREIGN PATENT DOCUMENTS

| CN | 101453490 | A | 6/2009 |
|---|---|---|---|
| CN | 101937377 | A | 1/2011 |
| CN | 103399806 | A | 11/2013 |
| CN | 103645971 | A | 3/2014 |
| CN | 105740098 | A | 7/2016 |
| JP | 2001195286 | A | 7/2001 |
| JP | 2006092553 | A | 4/2006 |
| JP | 2009205340 | A | 9/2009 |

* cited by examiner

*Primary Examiner* — Tyler J Torgrimson
(74) *Attorney, Agent, or Firm* — Leydig, Voit & Mayer, Ltd.

(57) ABSTRACT

To manage expired backups in a storage system, a backup server retrieves multiple deletion logs which record invalid data included in one or more expired backups. When a deletion condition is met, the backup server identifies a first large object based on the multiple deletion logs, and sends a data migration request to an object-based storage system to instruct the object-based storage system to copy valid data of the first large object to a second large object. Thereafter, the backup server sends an object deletion request to the object-based storage system to instruct the object-based storage system to delete the first large object, thereby clearing up the expired backups.

9 Claims, 11 Drawing Sheets

METHOD AND BACKUP SERVER FOR PROCESSING EXPIRED BACKUPS

CROSS-REFERENCE TO RELATED APPLICATIONS

This application is a continuation of International Application No. PCT/CN2017/118689, filed on Dec. 26, 2017, the disclosure of which is hereby incorporated by reference in its entirety.

TECHNICAL FIELD

Embodiments of the present invention relate to the storage field, and in particular, to an expired backup processing method and a backup server.

BACKGROUND

To ensure security of data, after the data is stored into a disk, the disk data may be backed up into an object-based storage system in an object-based storage manner by using a backup server. A specific process includes: The object-based storage system stores, as at least one object, a plurality of consecutive data slices included in the disk data. Each object includes at least one consecutive data slice. If disk backup data is stored in a plurality of objects in a decentralized manner, when the backup server subsequently needs to access the backup data, the backup server needs to access the object-based storage system a plurality of times to access the plurality of objects. Therefore, the backup server sends at least two objects and a large object identifier to the object-based storage system, and the object-based storage system stores the at least two objects as one large object, to reduce, by accessing the large object, times of accessing the object-based storage system.

To reduce a data amount for a backup, an incremental backup manner is usually used for the backup. However, currently, there is no technology for incrementally backing up disk data in a large object-based storage manner.

SUMMARY

Embodiments of the present invention provide an expired backup processing method and a backup server, to implement a technology of incrementally backing up disk data in a large object-based storage manner, and a method of how to process an expired backup.

According to a first aspect, an embodiment of the present invention provides an expired backup processing method. The method is performed by a backup server, and includes: Each time after an expired backup of first disk data is determined, the backup server creates a deletion log of the first disk data, and stores a pointer of invalid data in the expired backup into the deletion log, where the expired backup is an earliest backup in all unexpired backups of the first disk data that have been performed in an object-based storage system by a current first moment. After subsequently detecting that a deletion condition is met, the backup server obtains a plurality of deletion logs corresponding to the first disk data. An objective of obtaining the plurality of deletion logs is to determine, based on the plurality of deletion logs corresponding to the first disk data, a first target large object that is stored in the object-based storage system and that includes valid data and the invalid data. After determining the first target large object that includes the invalid data and the valid data, the backup server sends a data migration indication and an object deletion indication to the object-based storage system. The data migration indication is used to instruct the object-based storage system to migrate the valid data in the first target large object to another large object. The object deletion indication is used to instruct the object-based storage system to delete the first target large object.

In the present invention, after the expired backup is determined, the deletion log is created, and the pointer of the invalid data in the expired backup is stored into the deletion log. Therefore, the backup server subsequently can determine, based on the deletion logs, the large object that includes the invalid data and the valid data. In this way, expired backup processing is implemented for disk data that is incrementally backed up in a large object-based storage manner.

After the backup server determines the first target large object that includes the invalid data and the valid data, there are a plurality of implementations for sending the data migration indication and the object deletion indication. For example, the data migration indication and the object deletion indication may be included in one instruction, or may be sent respectively by using two instructions. If the data migration indication and the object deletion indication are included in one instruction, after receiving the instruction that includes the data migration indication and the object deletion indication, the object-based storage system first migrates the valid data in the first target large object to the another large object, and then deletes the first target large object. If the data migration indication and the object deletion indication are sent respectively by using two instructions, the backup server may first send an instruction including the data migration indication, and then send an instruction including the object deletion indication. Before sending the instruction including the object deletion indication, the backup server may first determine whether the object-based storage system has completed migration of the valid data. If it is determined that the object-based storage system has completed migration of the valid data, the backup server sends the instruction including the object deletion indication to the object-based storage system, to instruct the object-based storage system to delete the first target large object. The backup server may determine, based on whether a migration completion message returned by the object-based storage system is obtained, whether the object-based storage system has completed migration of the valid data.

Based on the first aspect, in a first implementation, the detecting whether a deletion condition is met includes:

detecting whether a quantity of the plurality of deletion logs corresponding to the first disk data reaches a preset deletion threshold, and if the preset deletion threshold is reached, determining that the deletion condition is met; or detecting whether a preset deletion time is reached, and if the preset deletion time is reached, determining that the deletion condition is met; or starting timing after the last time the deletion condition is met, detecting whether the timing ends, and if the timing ends, determining that the deletion condition is met.

Based on the first aspect or the first implementation of the first aspect, in a second implementation, after the determining, based on the plurality of deletion logs, a first target large object that is stored in the object-based storage system and that includes valid data and the invalid data, the method further includes: creating a pointer of the valid data after being moved, creating a movement log of the first disk data, and storing, into the movement log, a correspondence between a pointer of the valid data before being moved and the pointer of the valid data after being moved. The pointer of the valid data after being moved indicates a location that is in the another large object and that is of the valid data after being moved to the another large object.

Based on the second implementation of the first aspect, in a third implementation, the method further includes: receiving a data restoration request sent by a client, where the data restoration request includes a first disk identifier, a second disk identifier, and a backup identifier of a to-be-restored backup, the data restoration request is used to instruct to restore the first disk data into a second disk based on the to-be-restored backup corresponding to the backup identifier of the to-be-restored backup, and the to-be-restored backup is any backup in all the unexpired backups of the first disk data; obtaining backup metadata of the to-be-restored backup, and obtaining each movement log of the first disk data; determining, based on each movement log of the first disk data, whether a pointer the same as the pointer, recorded in the movement log, of the unmoved valid data exists in the backup metadata of the to-be-restored backup, and if the pointer exists, modifying the same pointer in the backup metadata of the to-be-restored backup to the pointer of the valid data after being moved corresponding to the pointer of the valid data before being moved, to obtain modified backup metadata, where the modified backup metadata includes an unmodified pointer and a modified pointer, and the modified pointer is the pointer, recorded in the movement log, of the moved valid data; obtaining, based on the modified backup metadata, the first disk data corresponding to the to-be-restored backup; and storing the first disk data into the second disk.

Based on the third implementation of the first aspect, in a fourth implementation, after the storing, into the movement log, a correspondence between a pointer of the valid data before being moved and the pointer of the valid data after being moved, the method further includes: creating an object identifier of the movement log; and storing a correspondence between the first disk identifier and the object identifier of the movement log, and sending a movement log storage request to the object-based storage system, where the movement log storage request includes the object identifier of the movement log and the movement log, and the movement log storage request is used to instruct the object-based storage system to store the movement log into an object corresponding to the object identifier of the movement log; and the obtaining each movement log of the first disk data includes: obtaining the object identifier of the movement log based on the first disk identifier, and sending a movement log obtaining request to the object-based storage system, where the movement log obtaining request includes the object identifier of the movement log, and the movement log obtaining request is used to instruct the object-based storage system to obtain the movement log from the object corresponding to the object identifier of the movement log; and receiving the movement log sent by the object-based storage system.

Based on any one of the first aspect or the first to the fourth implementations of the first aspect, in a fifth implementation, the determining, based on the plurality of deletion logs, a first target large object that is stored in the object-based storage system and that includes valid data and the invalid data includes: determining, based on the plurality of deletion logs, a first target large object that is stored in the object-based storage system and that includes invalid data; determining a data amount of all invalid data in the first target large object based on a predefined invalid data size and a quantity of pieces of the invalid data included in the first target large object; sending a data amount determining request to the object-based storage system, where the data amount determining request includes an identifier of the first target large object, and the data amount determining request is used to instruct the object-based storage system to send a data amount of the first target large object; receiving data amount attribute information, where the data amount attribute information includes the data amount of the first target large object; and if the data amount of all the invalid data in the first target large object is less than the data amount of the first target large object in the data amount attribute information, determining the first target large object stored in the object-based storage system as the first target large object that includes the invalid data and the valid data.

According to a second aspect, an expired backup processing method is provided. The method is performed by a backup server, and includes:

each time after an expired backup of first disk data is determined, creating a deletion log of the first disk data, and storing a pointer of invalid data in the expired backup into the deletion log, where the expired backup is an earliest backup in all unexpired backups of the first disk data that have been performed in an object-based storage system by a current first moment; detecting whether a deletion condition is met, and if the deletion condition is met, obtaining a plurality of deletion logs corresponding to the first disk data; determining, based on the plurality of deletion logs, a large object that is stored in the object-based storage system and that includes only the invalid data; and sending an object deletion indication to the object-based storage system, where the object deletion indication is used to instruct the object-based storage system to delete the large object that includes only the invalid data.

Based on the second aspect, in a first implementation, the detecting whether a deletion condition is met includes:

detecting whether a quantity of the plurality of deletion logs corresponding to the first disk data reaches a preset deletion threshold, and if the preset deletion threshold is reached, determining that the deletion condition is met; or detecting whether a preset deletion time is reached, and if the preset deletion time is reached, determining that the deletion condition is met; or starting timing after the last time the deletion condition is met, detecting whether the timing ends, and if the timing ends, determining that the deletion condition is met.

Based on the second aspect or the first implementation of the second aspect, in a second implementation, the determining, based on the plurality of deletion logs, a large object that is stored in the object-based storage system and that includes only the invalid data includes: determining, based on the plurality of deletion logs, a large object that includes invalid data; determining, based on a predefined invalid data size and a quantity of pieces of the invalid data included in the large object that includes the invalid data, a data amount of all invalid data in the object that includes the invalid data; sending a data amount determining request to the object-based storage system, where the data amount determining request includes an identifier of the large object that includes the invalid data, and the data amount determining request is used to instruct the object-based storage system to send a data amount of the large object that includes the invalid data; receiving data amount attribute information, where the data amount attribute information includes the data amount of the large object that includes the invalid data; and if the data amount of all the invalid data in the large object that includes the invalid data is the same as the data amount, in the data amount attribute information, of the large object that includes the invalid data, determining the large object that is stored in the object-based storage system and that includes the invalid data as the large object that includes only the invalid data.

According to a third aspect, an embodiment of the present invention provides a data backup method. The method includes: A backup server backs up first disk data before processing an expired backup. A process of backing up a data slice in the first disk data is as follows: The backup server receives a plurality of data slices of the first disk data to be backed up into an object-based storage system, and determines, based on a data slice size and a predefined data block size, a data block to be backed up into the object-based storage system. The data block includes at least one data slice in the first disk data. The backup server calculates a weak hash value of the data block. The backup server determines an identifier of another data block already stored in the object-based storage system, where the weak hash value of the data block is similar to a weak hash value of the another data block. The backup server queries the identifier of the another data block to determine, based on the identifier of the another data block, an identifier of a large object in which the another data block is located, determines that a size of data stored in the large object in which the another data block is located does not reach a predefined size, and sends a data backup request to the object-based storage system. The data backup request includes the data block and the identifier of the large object in which the another data block is located, and the data backup request is used to instruct the object-based storage system to store the data block into the large object in which the another data block is located. After receiving the data backup request, the object-based storage system stores the data block into the large object in which the another data block is located. In this way, in this embodiment of the present invention, during data backup, data blocks having similar weak hash values can be stored in a large object. A data slice in the another data block may be a data slice in the first disk data, or may be a data slice in other disk data.

It may be understood that, in the methods according to the first aspect and the second aspect, before processing the expired backup, the backup server may also back up the first disk data by using the method according to the third aspect.

According to a fourth aspect, a backup server is provided, including modules configured to perform the expired backup processing method according to the first aspect or any possible implementation of the first aspect, where the module may be implemented by using hardware, or may be implemented by hardware running corresponding software.

According to a fifth aspect, a backup server is provided, including modules configured to perform the expired backup processing method according to the second aspect or any possible implementation of the second aspect, where the module may be implemented by using hardware, or may be implemented by hardware running corresponding software.

According to a sixth aspect, a backup server is provided, including modules configured to perform the expired backup processing method according to the third aspect, where the module may be implemented by using hardware, or may be implemented by hardware running corresponding software.

According to a seventh aspect, a backup server is provided, including an interface, a memory, and a processor, where the interface is configured to communicate with an object-based storage system, the memory is configured to store a software program, and the processor performs the expired backup processing method according to the first aspect or any possible implementation of the first aspect by running the software program stored in the memory.

According to an eighth aspect, a backup server is provided, including an interface, a memory, and a processor, where the interface is configured to communicate with an object-based storage system, the memory is configured to store a software program, and the processor performs the expired backup processing method according to the second aspect or any possible implementation of the second aspect by running the software program stored in the memory.

According to a ninth aspect, a computer readable storage medium is provided, where the computer readable storage medium stores an instruction, and when the instruction runs on a computer, the computer performs the expired backup processing method according to the first aspect or any possible implementation of the first aspect.

According to a tenth aspect, a computer readable storage medium is provided, where the computer readable storage medium stores an instruction, and when the instruction runs on a computer, the computer performs the expired backup processing method according to the second aspect or any possible implementation of the second aspect.

DESCRIPTION OF EMBODIMENTS

The following describes the technical solutions in this application with reference to the accompanying drawings.

Figure 1:
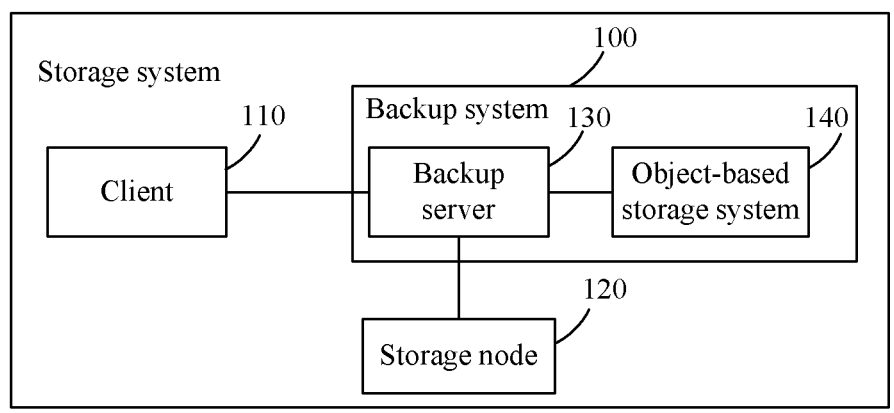
FIG. 1 is a schematic structural diagram of a backup system according to an embodiment of the present invention.

An embodiment of the present invention provides a backup system. Referring to FIG. 1, FIG. 1 is a schematic structural diagram of a storage system according to an embodiment of the present invention. The storage system includes a client 110, a storage node 120, and a backup system 100. The backup system 100 includes a backup server 130 and an object-based storage system 140. The backup server 130 is connected to the object-based storage system 140. The backup server 130 is connected to the client 110 and the storage node 120. The storage node 120 includes one or more disks. The disk may be a virtual machine disk or a physical disk.

The storage node 120 is configured to divide data, to be stored into the storage node 120, of a particular disk into a plurality of consecutive data slices, and store the plurality of consecutive data slices into a plurality of physical blocks of a disk of the storage node 120.

The backup server 130 is configured to: when receiving a data backup request sent by the client 110, or determining that a preset time is reached, fully or incrementally back up data in the disk of the storage node 120 into the object-based storage system 140, and create and store backup metadata and backup attribute information. The full backup means backing up all data in the disk of the storage node 120 into the storage system. The incremental backup means backing up modified data in the disk of the storage node 120 into the object-based storage system. The backup metadata is used to indicate a location, of each object in disk data, in the disk data. The backup metadata may record an identifier and a pointer of each object included in the disk data, and record the pointer of each object based on a sequence of objects in the disk. The backup attribute information includes a backup identifier and a backup time point of a backup and an identifier of the backup metadata. After creating the backup attribute information, the backup server 130 further stores a correspondence between a disk identifier of the disk of the storage node 120 and the backup attribute information.

Usually, the data backup request sent by the client 110 needs to include a disk identifier of a disk requiring a backup, and the backup server 130 fully or incrementally backs up, into the object-based storage system 140, data in the disk indicated by the disk identifier. For specific full backup and incremental backup processes, refer to descriptions in the following method embodiments. Details are not described herein.

After the disk data in the disk is fully or incrementally backed up, increasing backups are generated in the system. To save a storage space of the system, backups in the storage system need to be managed. The backup server in the backup system provided in this embodiment of the present invention deletes an expired backup as required.

The backup server 130 is configured to: when detecting that a total quantity of pieces of all backup attribute information of the disk exceeds a predetermined value, determine an earliest backup as an expired backup based on backup time points in all the backup attribute information. After determining the expired backup, the backup server 130 identifies invalid data in the expired backup by using backup metadata of the expired backup and backup metadata of a backup next to the expired backup, creates a deletion log, and stores a pointer of the invalid data in the expired backup into the deletion log. After creating the deletion log, the backup server 130 is further configured to delete backup attribute information of the expired backup, and create and store a correspondence between the disk identifier and an identifier of the deletion log. The invalid data is an object of a data slice that is in the expired backup and that is modified in the backup next, in order of creation, to the expired backup.

After detecting whether a deletion condition is met, the backup server 130 obtains, based on the correspondence between the disk identifier and the identifier of the deletion log, a plurality of deletion logs corresponding to the disk data. The deletion condition may be as follows: A quantity of the plurality of deletion logs corresponding to the disk data reaches a preset deletion threshold; or a preset deletion time is reached; or timing is started after the last time the deletion condition is met, and the timing ends.

The backup server 130 is further configured to: based on the plurality of deletion logs, determine a target large object that is stored in the object-based storage system 140 and that includes valid data and the invalid data, and determine a large object that includes only the invalid data. The valid data is an object of a data slice that is in the expired backup and that is not modified in the backup next, in order of creation, to the expired backup.

After determining the target large object that is stored in the object-based storage system 140 and that includes the valid data and the invalid data, the backup server 130 is further configured to send a data migration indication and an object deletion indication to the object-based storage system 140. The data migration indication is used to instruct the object-based storage system 140 to migrate the valid data in the target large object to another large object. The object deletion indication is used to instruct the object-based storage system 140 to delete the target large object. After determining the large object that includes only the invalid data, the backup server 130 is further configured to send an object deletion indication to the object-based storage system 140. The object deletion indication is used to instruct the object-based storage system 140 to delete the large object that includes only the invalid data.

After a period of time, accumulated expired backups are processed, to determine a large object that includes invalid data. If it is determined that the large object is a large object that includes valid data and the invalid data, the valid data in the large object is moved into another large object, and then the large object is deleted to save a storage space of the system. If it is determined that the large object is a large object that includes only the invalid data, the large object is deleted to save a storage space of the system. In this way, in this embodiment of the present invention, the expired backup is deleted for the disk data that is incrementally backed up in a large object-based storage manner, and it is avoided that each time after an expired backup is determined, the expired backup is processed; instead, a plurality of accumulated expired backups are processed after a period of time, thereby simplifying steps of frequently processing the expired backups by the backup system.

If valid data in a large object is moved into another large object, a pointer of the valid data in the large object is modified. To avoid updating pointers, recorded in backup metadata respectively corresponding to all other backups, of valid data in the large object, a correspondence between a pointer of the valid data before being moved in the large object and a pointer of the valid data after being moved is recorded by using a movement log, so that when a particular backup needs to be accessed subsequently, it is determined whether a pointer the same as the pointer, recorded in the movement log, of the unmoved valid data exists in backup metadata of the particular backup. If the pointer exists, the same pointer in the backup metadata of the backup is modified to the pointer of the valid data after being moved, thereby avoiding updating, after the valid data is moved, the backup metadata respectively corresponding to all the other backups.

After moving valid data in a large object into another large object, the backup server 130 is further configured to create a movement log, and store, into the movement log, a correspondence between a pointer of the valid data before being moved and a pointer of the valid data after being moved. In this way, when subsequently accessing the moved valid data in the disk data by using backup metadata of an unexpired backup, the backup server 130 updates the backup metadata of the unexpired backup based on the correspondence, stored in the movement log, between the pointer of the valid data before being moved and the pointer of the valid data after being moved. During an update of the backup metadata of the unexpired backup, a pointer that is in the backup metadata of the unexpired backup and that is the same as the pointer, recorded in the movement log, of the unmoved valid data is modified. The modified pointer is the pointer, recorded in the movement log, of the moved valid data.

For example, after receiving a data restoration request sent by the client 110, and determining a to-be-restored backup from all unexpired backups, the backup server 130 modifies backup metadata of the to-be-restored backup based on a movement log, obtains, based on modified backup metadata, all objects included in disk data, and then restores the disk data into a target disk. The target disk may be located in another storage node 120, and may be a physical disk or a virtual machine disk, or the target disk may be located in the storage node 120 in which the disk data is located before the disk data is backed up, or the target disk and a disk in which the disk data is located before the disk data is backed up are a same disk.

Correspondingly, the object-based storage system 140 in the backup system 100 is configured to store backup data. During the full backup, the object-based storage system 140 is configured to store all the data in the disk data. During the incremental backup, the object-based storage system 140 is configured to store the modified data in the disk data.

The object-based storage system 140 may further store backup metadata created during a disk data backup.

The object-based storage system 140 may further store a deletion log or a movement log created when an expired backup of the disk data is processed.

In the backup system, the backup server 130 and the object-based storage system 140 are independently deployed, and the client 110 may be a virtual machine deployed on the backup server 130 or be deployed independent of the backup server 130. When the client 110 is deployed independent of the backup server 130, the client 110 may be a device independent of the backup server 130 or a virtual machine deployed on a device independent of the backup server 130. The storage node 120 may be a storage device in the backup server 130 or be deployed independent of the backup server 130. The storage node 120 is configured to manage a physical disk or a virtual machine disk. The client 110 may be a physical server or various types of terminal devices. The terminal device in this embodiment of the present invention includes a tablet computer, a notebook computer, a mobile Internet device, a palmtop computer, a desktop computer, a mobile phone, or a terminal device in another product form. The client 110 may alternatively be a software module, for example, a software module running on a physical device or a virtual machine running on a physical server.

Figure 2:
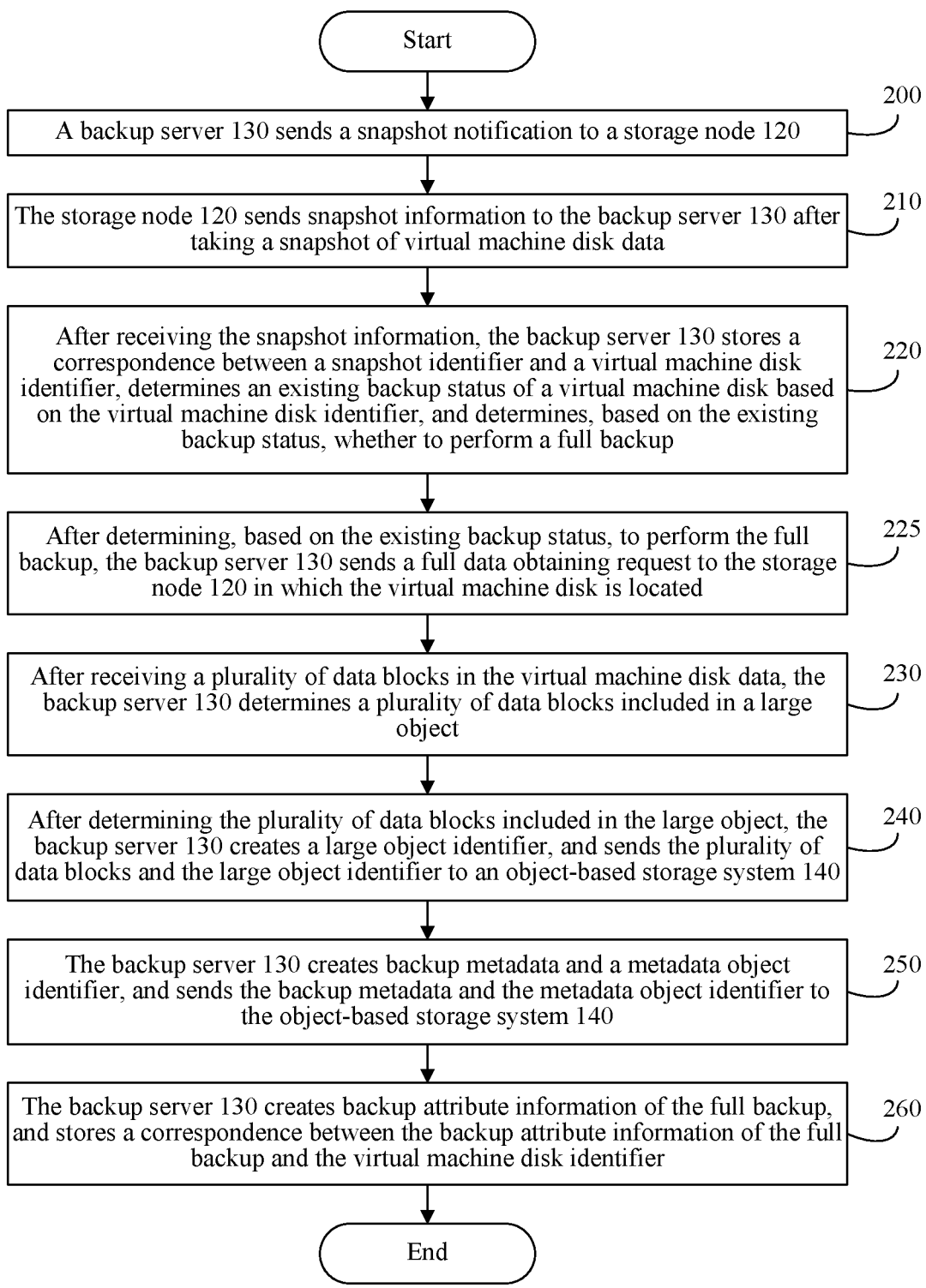
FIG. 2 is a flowchart of a full backup method for virtual machine disk data according to an embodiment of the present invention.

The following describes an expired data deletion method according to an embodiment of the present invention. The method is applied to the backup system shown in FIG. 1. Before the expired data deletion method provided in this embodiment of the present invention is described, backing up virtual machine disk data is used as an example to describe a procedure in which a backup server 130 first fully and then incrementally backs up the virtual machine disk data in an object-based storage manner. Referring to FIG. 2, FIG. 2 is a flowchart of a full backup method for virtual machine disk data according to an embodiment of the present invention. The method includes the following steps.

200. A backup server 130 sends a snapshot notification to a storage node 120.

The snapshot notification includes a virtual machine disk identifier. The snapshot notification is used to instruct the storage node 120 to take a snapshot of a virtual machine disk corresponding to the virtual machine disk identifier. In this implementation, the disk corresponding to the virtual machine disk identifier is a disk requiring a backup. After receiving the snapshot notification, the storage node 120 takes a snapshot of the virtual machine disk, creates a snapshot identifier of the virtual machine disk, and stores a correspondence between the virtual machine disk identifier and the snapshot identifier.

There may be a plurality of implementations of how a backup system starts a full backup. For example, a user may select, by using a client 110, a time point for a full backup of virtual machine disk data. After the time point for the full backup is reached, the client 110 sends a backup request to the backup server 130. The backup request includes an identifier of the storage node 120 and the virtual machine disk identifier. After receiving the backup request sent by the client 110, the backup server 130 sends the snapshot notification to the storage node 120. Alternatively, after separately storing, into a physical block of the virtual machine disk, a plurality of consecutive data slices to be stored into the virtual machine disk, the storage node 120 sends a backup request to the backup server 130 to start a full backup. Alternatively, a user presets, in the backup server 130, a full backup time point for the storage node 120. After the full backup time point is reached, the backup server 130 sends the snapshot notification to the storage node 120. In another embodiment, specific implementation of how a backup system starts a full backup is not limited by the examples given in this embodiment of the present invention.

210. The storage node 120 sends snapshot information to the backup server 130 after taking a snapshot of virtual machine disk data. The snapshot information includes the snapshot identifier of the virtual machine disk and the virtual machine disk identifier.

When taking a snapshot of the virtual machine disk data, the storage node 120 creates the snapshot identifier of the virtual machine disk, and then generates the snapshot information based on the snapshot identifier of the virtual machine disk and the virtual machine disk identifier. The storage node 120 sends the virtual machine disk identifier and the snapshot identifier to the backup server 130 by sending the snapshot information.

220. After receiving the snapshot information, the backup server 130 stores a correspondence between a snapshot identifier and a virtual machine disk identifier, determines an existing backup status of a virtual machine disk based on the virtual machine disk identifier, and determines, based on the existing backup status, whether to perform a full backup.

In step 220, that the backup server 130 determines an existing backup status of a virtual machine disk based on the virtual machine disk identifier includes the following two cases:

Case 1: The backup server 130 determines, based on the virtual machine disk identifier, that a quantity of existing backups of the virtual machine disk is 0. If the quantity of existing backups is 0, a full backup is performed on the virtual machine disk data.

Case 2: The backup server 130 determines, based on the virtual machine disk identifier, that a quantity of existing backups of the virtual machine disk is not 0, and that information stored during a latest backup performed on the virtual machine disk is inconsistent with incremental information that needs to be stored when a backup is required.

In case 2, snapshot information sent to the backup server further includes a data amount, recorded in the storage node, of a snapshot during a previous backup. After determining, based on the virtual machine disk identifier, that the quantity of existing backups of the virtual machine disk is not 0, the backup server compares a data amount, recorded in the backup server, of the snapshot during the previous backup with the data amount, recorded in the storage node, of the snapshot during the previous backup to determine whether the information stored during the latest backup performed on the virtual machine disk is consistent with the incremental information that needs to be stored when the backup is required. If the data amount, recorded in the backup server, of the snapshot during the previous backup is different from the data amount, recorded in the storage node, of the snapshot during the previous backup, it indicates that the information stored during the latest backup performed on the virtual machine disk is inconsistent with the incremental information that needs to be stored when the backup is required.

Alternatively, in case 2, snapshot information sent to the backup server further includes an identifier of a previous snapshot. After determining, based on the virtual machine disk identifier, that the quantity of existing backups of the virtual machine disk is not 0, the backup server compares an identifier, recorded in the backup server, of a snapshot during the previous backup with an identifier, recorded in the storage node, of the snapshot during the previous backup to determine whether the information stored during the latest backup performed on the virtual machine disk is consistent with the incremental information that needs to be stored when the backup is required. If the identifier, recorded in the backup server, of the snapshot during the previous backup is different from the identifier, recorded in the storage node, of the snapshot during the previous backup, it indicates that the information stored during the latest backup performed on the virtual machine disk is inconsistent with the incremental information that needs to be stored when the backup is required.

225. After determining to perform the full backup, the backup server 130 sends a full data obtaining request to the storage node 120 in which the virtual machine disk is located.

The full data obtaining request includes the virtual machine disk identifier and a location, of a to-be-read data block, in the virtual machine disk data. The to-be-read data block includes at least one data slice. A quantity of data slices in the to-be-read data block is determined based on a to-be-read data block size and a data slice size. The to-be-read data block size is predefined in backup software of the backup server 130, and to-be-read data block sizes predefined in different backup software may be different. The backup server 130 may send a plurality of full data obtaining requests to obtain all data slices of the virtual machine disk data.

The location, of the to-be-read data block, in the virtual machine disk data may include the following two cases:

Case 1: The location includes a start location, of the to-be-read data block, in the virtual machine disk data and the to-be-read data block size. If a first data slice in the to-be-read data block is the $i^{th}$ data slice in the virtual machine disk data and i is an integer greater than 0, the start location, of the to-be-read data block, in the virtual machine disk data is a product of (i−1) and the data slice size. For example, the to-be-read data block is the third data slice in the virtual machine disk data. If the to-be-read data slice size is 4 M, the start location, of the to-be-read data block, in the virtual machine disk data is a product of (3−1) and 4 M. To be specific, the start location, of the to-be-read data block, in the virtual machine disk data is 8 M. For another example, the first data slice in the to-be-read data block is the first data slice in the virtual machine disk data. If the to-be-read data slice size is 4 M, the start location, of the to-be-read data block, in the virtual machine disk data is a product of (1−1) and 4 M. To be specific, the start location, of the to-be-read data block, in the virtual machine disk data is 0 M.

Case 2: The location includes a start location data and an end location, of the to-be-read data block, in the virtual machine disk data. The start location, of the to-be-read data block, in the virtual machine disk data is the same as that in the foregoing representation manner, and details are not described herein again. The end location, of the to-be-read data block, in the virtual machine disk data is an end location of the last data slice in the to-be-read data block. If the last data slice in the to-be-read data block is the $w^{th}$ data slice in the virtual machine disk data, the end location of the last data slice in the to-be-read data block is a product of w and the data slice size.

It may be understood that, the start location and the end location are offsets.

Alternatively, if there are a plurality of to-be-read data blocks, and the plurality of to-be-read data blocks are consecutive data blocks, the full data obtaining request includes the virtual machine disk identifier and a location, of the plurality of to-be-read data blocks, in the virtual machine disk data. The location, of the plurality of to-be-read data blocks, in the virtual machine disk data may be a start location, of the first to-be-read data block of the plurality of to-be-read data blocks, in the virtual machine disk data and a size of the plurality of to-be-read data blocks. Alternatively, the location, of the plurality of to-be-read data blocks, in the virtual machine disk data may be a start location, of the first to-be-read data block of the plurality of to-be-read data blocks, in the virtual machine disk data and an end location, of the last to-be-read data block of the plurality of to-be-read data blocks, in the virtual machine disk data. For the start location, of the first to-be-read data block of the plurality of to-be-read data blocks, in the virtual machine disk data and the end location, of the last to-be-read data block of the plurality of to-be-read data blocks, in the virtual machine disk data, refer to the manner of determining the location, of the to-be-read data block, in the virtual machine disk data. Specific implementation details are not described herein again.

After step 225, the storage node 120 in which the virtual machine disk is located receives the full data obtaining request, queries, based on the location, of the to-be-read data block, in the virtual machine disk data, a plurality of data slices in the virtual machine disk data that are included in the data block, and then sends, to the backup server 130, the plurality of data slices in the virtual machine disk data that are included in the data block.

230. After receiving a plurality of data blocks in the virtual machine disk data, the backup server 130 determines a plurality of data blocks included in a large object. Each data block is an object in the large object.

A plurality of consecutive data blocks received by the backup server 130 and consistent with a predetermined quantity are the plurality of data blocks included in the large object.

After receiving the plurality of consecutive data blocks consistent with the predetermined quantity, the backup server may calculate a weak hash value of each data block, and may determine a plurality of data blocks having similar weak hash values as the plurality of data blocks included in the large object 240. After determining the plurality of data blocks included in the large object, the backup server 130 creates a large object identifier, and sends the plurality of data blocks and the large object identifier to an object-based storage system 140.

After receiving the plurality of data blocks and the large object identifier, the object-based storage system 140 stores the plurality of data blocks into the large object corresponding to the large object identifier.

All data blocks in the virtual machine disk constitute a plurality of large objects and are sent to the object-based storage system 140.

250. The backup server 130 creates backup metadata and a metadata object identifier, and sends the backup metadata and the metadata object identifier to the object-based storage system 140.

The backup metadata is used to indicate a location, of each object in the virtual machine disk data, in the virtual machine disk data. The backup metadata may record identifiers and pointers of all objects included in the virtual machine disk data, and record the pointers of all the objects based on a sequence of objects in the virtual machine disk.

Alternatively, an identifier of an object may also be used as a pointer. To be specific, the backup metadata may record only identifiers of all objects included in the virtual machine disk data, and record the identifiers of all the objects based on a sequence of objects in the virtual machine disk. The identifier, recorded in the backup metadata, of the object may include an identifier of a large object, and a location, of the object, in a large object to which the object belongs.

If an object is included in a large object, a pointer of the object indicates a location, of the object, in the large object to which the object belongs. For example, the following Table 1 shows pointers, recorded in the backup metadata, of some objects in the first four large objects in the disk data.

TABLE 1

| Pointer of the first object in a large object A | Pointer of the second object in a large object A | Pointer of the third object in a large object A | Pointer of the first object in a large object B | Pointer of the second object in a large object B | Pointer of the first object in a large object C | Pointer of the first object in a large object D |
|---|---|---|---|---|---|---|
| A1 | A2 | A3 | B1 | B2 | C1 | D1 |

260. The backup server 130 creates backup attribute information of the full backup, and stores a correspondence between the backup attribute information of the full backup and the virtual machine disk identifier. The backup attribute information of the full backup includes a backup identifier of the full backup, the metadata object identifier of the backup metadata, and a backup time point.

The foregoing steps 200 to 260 describe the method of how the backup system fully backs up the virtual machine disk data. In an embodiment of the present invention, after the virtual machine disk data is fully backed up, a user may have modified the data, and then the modified data is incrementally backed up. A specific incremental backup process includes a process in FIG. 3. After the incremental backup, to reduce a data amount of backup data, the backup server 130 determines and processes an expired backup. The following describes in detail a method of how the backup system incrementally backs up the virtual machine disk data.

Figure 3:
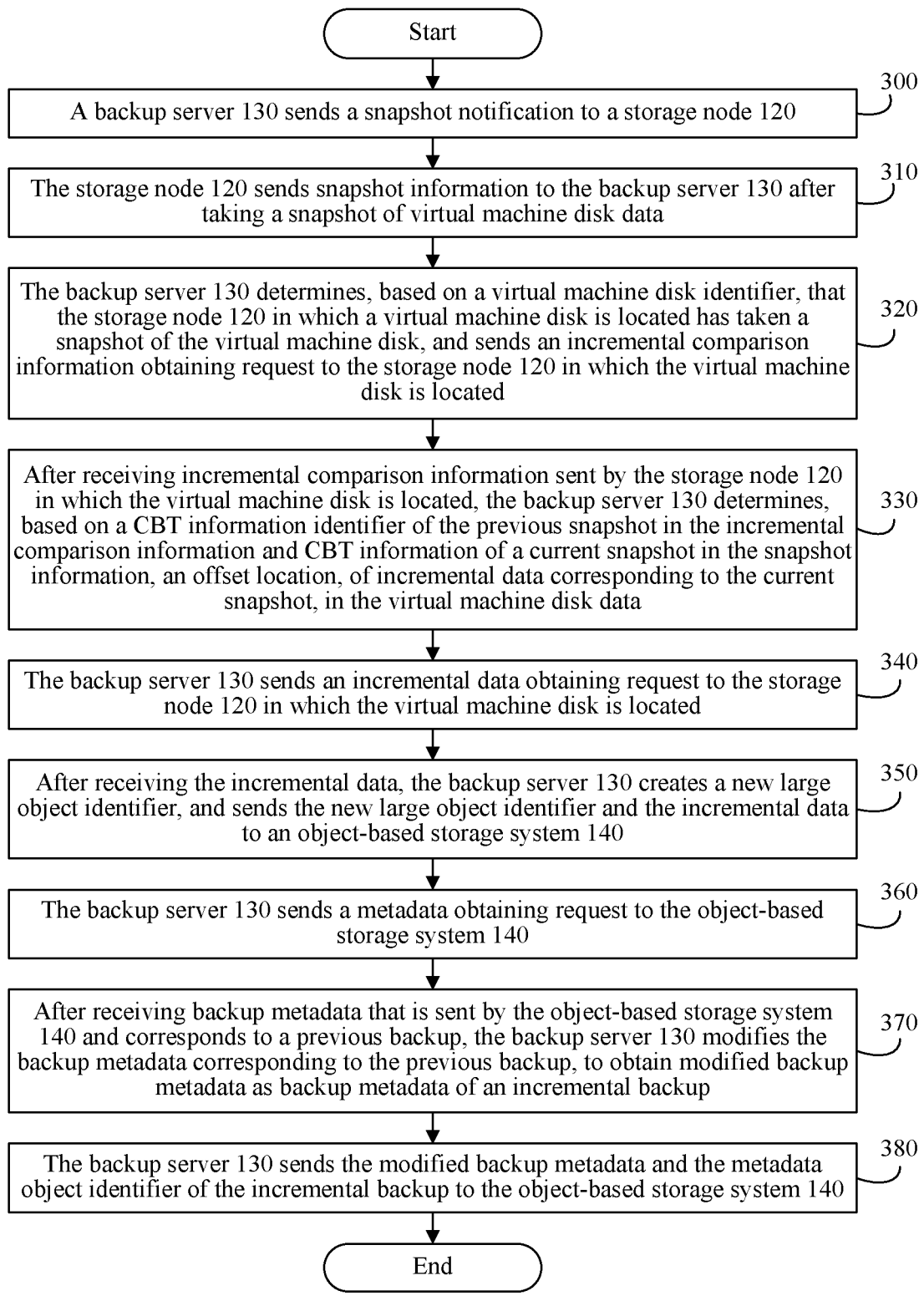
FIG. 3 is a flowchart of an incremental backup method for virtual machine disk data according to an embodiment of the present invention.

Referring to FIG. 3, FIG. 3 is a flowchart of an incremental backup method for virtual machine disk data according to an embodiment of the present invention. As shown in FIG. 3, the incremental backup method, provided in this embodiment of the present invention, for virtual machine disk data includes the following steps.

300. A backup server 130 sends a snapshot notification to a storage node 120.

The snapshot notification includes a virtual machine disk identifier. The snapshot notification is used to instruct the storage node 120 to take a snapshot of a virtual machine disk corresponding to the virtual machine disk identifier. In this implementation, the disk corresponding to the virtual machine disk identifier is a disk requiring a backup. After receiving the snapshot notification, the storage node 120 takes a snapshot of the virtual machine disk, creates a snapshot identifier of the virtual machine disk, and stores a correspondence between the virtual machine disk identifier and the snapshot identifier.

There may be a plurality of implementations of how a backup system starts an incremental backup. For example, a user may select, by using a client 110, a time point for an incremental backup of virtual machine disk data. After the time point for the incremental backup is reached, the client 110 sends a backup request to the backup server 130. The backup request includes an identifier of the storage node 120 and the virtual machine disk identifier. After receiving the backup request sent by the client 110, the backup server 130 sends the snapshot notification to the storage node 120. Alternatively, after the storage node 120 separately stores, into a physical block of the virtual machine disk, a plurality of consecutive data slices to be stored into the virtual machine disk, if the storage node 120 in which the virtual machine disk is located modifies at least one data slice in at least one object in virtual machine disk data, the storage node 120 sends a backup request to the backup server 130 to start an incremental backup. Alternatively, a user presets, in the backup server 130, a time point for an incremental backup for the storage node 120. After the time point for the incremental backup is reached, the backup server 130 sends the snapshot notification to the storage node 120. In another embodiment, specific implementation of how a backup system starts an incremental backup is not limited by the examples given in this embodiment of the present invention.

310. The storage node 120 sends snapshot information to the backup server 130 after taking a snapshot of virtual machine disk data. The snapshot information includes a snapshot identifier of the current snapshot, change block tracking (Change Block Tracking, CBT) information, and the virtual machine disk identifier.

When taking a snapshot of the virtual machine disk data, the storage node 120 creates the snapshot identifier of the virtual machine disk and the CBT information of the current snapshot. After creating the snapshot identifier of the virtual machine disk, the storage node 120 may generate the snapshot information based on the snapshot identifier of the virtual machine disk, the CBT information of the current snapshot, and the virtual machine disk identifier. The storage node 120 sends the virtual machine disk identifier, the CBT information of the current snapshot, and the snapshot identifier to the backup server 130 by sending the snapshot information.

After creating the snapshot identifier of the virtual machine disk and the CBT information of the current snapshot, the storage node 120 stores a correspondence between the CBT information of the current snapshot, the snapshot identifier, and the virtual machine disk identifier.

In this implementation, the CBT information of the current snapshot is used to indicate a modification status of each data slice in the virtual machine disk data during the current snapshot of a previous snapshot. The CBT information of the current snapshot includes a CBT information identifier of the current snapshot and a modification status flag of each data slice in the virtual machine disk data. The CBT information of the current snapshot records the modification status flag of each data slice in the virtual machine disk data in a sequence of all data slices included in the virtual machine disk data. The modification status flag is used to indicate a modification status of a data slice in the virtual machine disk data during the current snapshot of the previous snapshot. The modification status may include a modified state and an unmodified state. For example, a number 0 is used to indicate that the modification status of the data slice in the virtual machine disk data during the current snapshot of the previous snapshot is the unmodified state, and number 1 is used to indicate that the modification status of the data slice in the virtual machine disk data during the current snapshot of the previous snapshot is the modified state. In another implementation, the modification status flag may be, for example, Chinese characters "modified" or "unmodified", or may be a letter, a number, or another symbol, or may be a combination of a letter, a number, and another symbol. A specific representation form of the modification status flag is not limited by this embodiment.

320. The backup server 130 determines, based on a virtual machine disk identifier, that the storage node 120 in which a virtual machine disk is located has taken a snapshot of the virtual machine disk, and then sends an incremental comparison information obtaining request to the storage node 120 in which the virtual machine disk is located.

The incremental comparison information obtaining request includes the snapshot identifier of the virtual machine disk and the virtual machine disk identifier.

After step 320, the storage node 120 in which the virtual machine disk is located receives the incremental comparison information obtaining request, and sends incremental comparison information to the backup server 130. The incremental comparison information includes a CBT information identifier that is of the previous snapshot and that is generated during the previous snapshot of the current snapshot corresponding to the snapshot identifier of the virtual machine disk.

After receiving the incremental comparison information obtaining request, the storage node 120 in which the virtual machine disk is located queries, based on the snapshot identifier of the virtual machine disk, CBT information that is of the previous snapshot and that is generated during the previous snapshot of the current snapshot corresponding to the snapshot identifier of the virtual machine disk. If the CBT information that is of the previous snapshot and that is generated during the previous snapshot of the current snapshot corresponding to the snapshot identifier of the virtual machine disk is found, the storage node 120 sends the CBT information identifier of the previous snapshot in the CBT information of the previous snapshot to the backup server 130. If the CBT information that is of the previous snapshot and that is generated during the previous snapshot of the current snapshot corresponding to the snapshot identifier of the virtual machine disk is not found, the storage node 120 sends query failure information to the backup server 130.

If the current snapshot is a second snapshot, a first snapshot is a snapshot during a full backup. No CBT information is created when the snapshot is created during the full backup. Therefore, the storage node 120 cannot find the CBT information that is of the previous snapshot and that is generated during the previous snapshot of the current snapshot corresponding to the snapshot identifier of the virtual machine disk, and then sends the query failure information to the backup server 130.

330. After receiving incremental comparison information sent by the storage node 120 in which the virtual machine disk is located, the backup server 130 determines, based on a CBT information identifier of a previous snapshot in the incremental comparison information and CBT information of a current snapshot in the snapshot information, an offset location, of incremental data corresponding to the current snapshot, in the virtual machine disk data.

A specific implementation in which the backup server 130 determines an offset location, of incremental data corresponding to the current snapshot, in the virtual machine disk data includes: The backup server 130 first determines whether a CBT information identifier recorded in the backup server 130 during a previous backup, performed by the backup server 130, of the virtual machine disk data is the same as the CBT information identifier of the previous snapshot in the incremental comparison information. If the identifiers are the same, the backup server 130 determines, based on the modification status flag recorded in the CBT information of the current snapshot, the offset location, of the incremental data corresponding to the current snapshot, in the virtual machine disk data.

A specific implementation in which the backup server 130 determines, based on the modification status flag recorded in the CBT information of the current snapshot, the offset location, of the incremental data corresponding to the current snapshot, in the virtual machine disk data is as follows: The backup server 130 reads a predetermined quantity of modification status flags based on a sequence of modification status flags recorded in the CBT information of the current snapshot. If the predetermined quantity of modification status flags include a modification status flag indicating that a modification status is modified, the backup server 130 determines that a plurality of data slices corresponding to the predetermined quantity of modification status flags include a modified data slice. The predetermined quantity is equal to a quantity of data slices in one object. An offset location, of the predetermined quantity of modification status flags, in the modification status flags recorded in the CBT information of the current snapshot is the offset location, of the incremental data corresponding to the current snapshot, in the virtual machine disk data.

After sequentially determining offset locations, of a plurality of pieces of incremental data, in the virtual machine disk data in the foregoing manner of determining the offset location, of the incremental data, in the virtual machine disk data, the backup server 130 sequentially sends incremental data obtaining requests to the storage node 120 in which the virtual machine disk is located, that is, sequentially performs the following step 340.

340. The backup server 130 sends an incremental data obtaining request to the storage node 120 in which the virtual machine disk is located. The incremental data obtaining request includes the virtual machine disk identifier, and the offset location, of the incremental data, in the virtual machine disk data.

There are two representation manners of the offset location, of the incremental data, in the virtual machine disk data. For specific implementation, refer to the representation manners of the offset location, of the to-be-read data block, in the virtual machine disk data in the full backup process shown in FIG. 2. Details are not described herein again.

After step 340, the storage node 120 in which the virtual machine disk is located receives the incremental data obtaining request, and queries the incremental data in the virtual machine disk data based on the offset location, of the incremental data, in the virtual machine disk data. Then the storage node 120 in which the virtual machine disk is located sends the incremental data to the backup server 130.

350. After receiving the incremental data, the backup server 130 creates a new large object identifier, and sends the new large object identifier and the incremental data to an object-based storage system 140. Each piece of incremental data is stored into the object-based storage system 140 as a new object in a new large object.

A plurality of new objects corresponding to a plurality of pieces of incremental data may belong to one or more new large objects.

For example, backup software predefines a quantity of objects that actually can be stored in a large object. When a quantity of pieces of received incremental data reaches the quantity of the plurality of objects that actually can be stored in the large object, the backup server 130 creates a new large object identifier, sends the plurality of pieces of received incremental data and the new large object identifier to the object-based storage system 140, so that the object-based storage system 140 stores the plurality of pieces of incremental data into a new large object corresponding to the new large object identifier.

After step 350, the object-based storage system 140 receives the incremental data, and stores, in an object-based storage manner, the incremental data, as an incremental backup, into a new object corresponding to the new large object identifier. Then the object-based storage system 140 sends an incremental backup completion request to the backup server 130.

When performing the incremental backup, if backup metadata corresponding to the incremental backup is stored in the object-based storage manner, the backup server 130 creates a backup identifier of the incremental backup and a metadata object identifier, and stores a correspondence between the backup identifier of the incremental backup and the metadata object identifier.

360. The backup server 130 sends a metadata obtaining request to the object-based storage system 140.

The metadata obtaining request includes a metadata object identifier corresponding to a previous backup.

Before creating the metadata obtaining request, the backup server 130 first queries a backup identifier of the previous backup, and queries, based on the backup identifier of the previous backup, the metadata object identifier corresponding to the backup identifier of the previous backup.

After step 360, the object-based storage system 140 receives the metadata obtaining request, and sends backup metadata corresponding to the previous backup to the backup server 130.

370. After receiving backup metadata that is sent by the object-based storage system 140 and that corresponds to a previous backup, the backup server 130 modifies the backup metadata corresponding to the previous backup, to obtain modified backup metadata as backup metadata of an incremental backup.

The backup server 130 modifies a pointer of an object corresponding to the incremental data, where a modified pointer is used to indicate a location, of an object corresponding to the incremental data stored in the object-based storage system 140, in a new large object to which the object belongs.

For example, modifying some data in a part of disk data related to the foregoing Table 1 is used as an example, to describe a representation form of the modified backup metadata. Based on a part of disk data related to Table 1, if the backup server 130 modifies at least one data slice in the first object B1 in the large object B and at least one data slice in the first object D1 in the large object D, the backup system creates a new large object E during an incremental backup. The backup server 130 stores, into the new large object E, objects to which modified data slices belong. Therefore, the new large object E includes two objects having the modified data slices. After the backup server 130 stores, into the new large object E, the objects to which the modified data slices belong, the backup server 130 obtains backup metadata related to Table 1, and modifies the backup metadata related to Table 1. A part of modified backup metadata is shown in the following Table 2.

TABLE 2

| Pointer of the first object in a large object A | Pointer of the second object in a large object A | Pointer of the third object in a large object A | Pointer of the first object in a large object E | Pointer of the second object in a large object B | Pointer of the first object in a large object C | Pointer of the second object in a large object E |
|---|---|---|---|---|---|---|
| A1 | A2 | A3 | E1 | B2 | C1 | E2 |

After obtaining the modified backup metadata, the backup server 130 creates the metadata object identifier of the backup metadata of the incremental backup, and then creates backup attribute information of the incremental backup. The backup attribute information of the incremental backup includes the backup identifier of the incremental backup, the metadata object identifier, and a backup time point. The backup server 130 stores a correspondence between the backup attribute information of the incremental backup and the virtual machine disk identifier.

380. The backup server 130 sends the modified backup metadata and a metadata object identifier of the incremental backup to the object-based storage system 140.

When sending the backup metadata of the incremental backup to the object-based storage system 140, the backup server 130 instructs the object-based storage system 140 to store the backup metadata of the incremental backup into an object that corresponds to the metadata object identifier corresponding to the incremental backup.

After step 380, the object-based storage system 140 stores the backup metadata created during the incremental backup into the object corresponding to the metadata object identifier of the incremental backup, and then sends a metadata storage completion message for the incremental data to the backup server 130.

The foregoing steps 300 to 380 describe the method of how the backup system incrementally backs up the virtual machine disk data in the object-based storage manner. After the full backup or the incremental backup of the virtual machine disk data is completed, to save a storage space of the backup system, in this embodiment of the present invention, the backup server 130 detects a total quantity of unexpired backups in all backups of the virtual machine disk data in the object-based storage system 140. If the total quantity of unexpired backups in all the backups of the disk data in the object-based storage system 140 exceeds a predetermined value, an earliest backup in all the unexpired backups in the object-based storage system 140 is determined as an expired backup, and the backup system further processes the earliest backup in all the unexpired backups to save a storage space of the backup system. The following describes an expired backup processing method according to an embodiment of the present invention.

Figure 4:
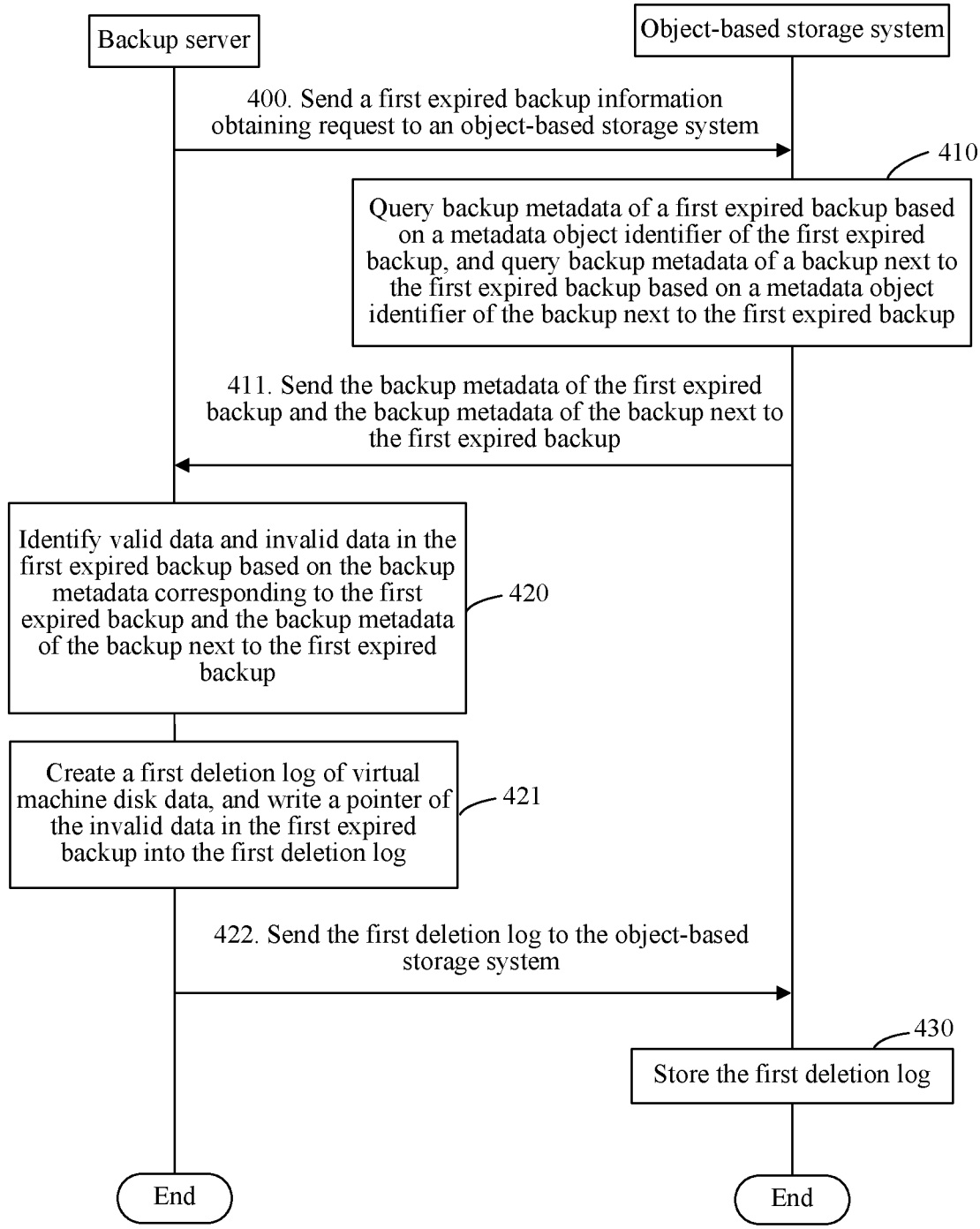
FIG. 4 is a flowchart of an expired backup processing method according to an embodiment of the present invention.

Referring to FIG. 4, FIG. 4 is a flowchart of an expired backup processing method according to an embodiment of the present invention. As shown in FIG. 4, the expired backup processing method provided in this embodiment of the present invention includes the following steps.

400. After determining a first expired backup of virtual machine disk data, a backup server 130 sends a first expired backup information obtaining request to an object-based storage system 140. The first expired backup information obtaining request includes a metadata object identifier of the first expired backup and a metadata object identifier of a backup next to the first expired backup.

Before step 400, the backup server 130 determines the first expired backup of the virtual machine disk data.

A process of determining the first expired backup includes: The backup server 130 detects a quantity of pieces of all backup attribute information stored in the backup server 130. If the quantity of pieces of all the backup attribute information stored in the backup server 130 exceeds a predetermined value, the backup server 130 queries, based on the backup attribute information, for a backup identifier of the first expired backup in all backups of the virtual machine disk data. The first expired backup is an earliest backup in all unexpired backups of the virtual machine disk data that have been performed in the object-based storage system 140 by a current first moment.

After determining the first expired backup of the virtual machine disk data and before sending the first expired backup information obtaining request, the backup server 130 first queries the backup identifier of the first expired backup, and then queries, based on the backup identifier of the first expired backup, the metadata object identifier corresponding to the backup identifier of the first expired backup. In addition, before sending the first expired backup information obtaining request, the backup server 130 first queries a backup identifier of the backup next to the first expired backup, and then queries, based on the backup identifier of the backup next to the first expired backup, the metadata object identifier corresponding to the backup identifier of the backup next to the first expired backup. After determining the metadata object identifier of the first expired backup and the metadata object identifier of the backup next to the first expired backup, the backup server 130 sends the first expired backup information obtaining request to the object-based storage system 140, to instruct the object-based storage system 140 to send, to the backup server 130, backup metadata corresponding to the metadata object identifier of the first expired backup and the metadata object identifier of the backup next to the first expired backup.

410. After receiving the first expired backup information obtaining request, the object-based storage system 140 queries backup metadata of the first expired backup based on a metadata object identifier of the first expired backup, and queries backup metadata of a backup next to the first expired backup based on a metadata object identifier of the backup next to the first expired backup.

411. The object-based storage system 140 sends the backup metadata of the first expired backup and the backup metadata of the backup next to the first expired backup to the backup server 130.

420. After receiving the backup metadata corresponding to the first expired backup and the backup metadata of the backup next to the first expired backup, the backup server 130 identifies valid data and invalid data in the first expired backup based on the backup metadata corresponding to the first expired backup and the backup metadata of the backup next to the first expired backup.

A specific implementation for determining valid data and invalid data in the first expired backup includes: The backup server 130 first compares the backup metadata of the first expired backup with the backup metadata corresponding to the backup next to the first expired backup, to determine whether same arrangement locations in the backup metadata corresponding to the first expired backup and the backup metadata corresponding to the next backup point to a same object. If the same arrangement locations point to the same object, it indicates that an object to which the arrangement location points in the first expired backup is valid data. Otherwise, if the same arrangement locations point to different objects, it indicates that an object to which the arrangement location points in the first expired backup is invalid data.

421. After determining the invalid data in the first expired backup, the backup server 130 creates a first deletion log of the virtual machine disk data, and stores a pointer of the invalid data in the first expired backup into the first deletion log.

For example, based on pointers, shown in Table 1, of some objects in backup metadata about a full backup and pointers, shown in Table 2, of some objects in backup metadata about an incremental backup, if the full backup corresponding to Table 1 is the first expired backup, and the incremental backup corresponding to Table 2 is the backup next to the first expired backup, an object corresponding to the pointer B1 of the first object in the large object B in the first expired backup is invalid data, and an object corresponding to the pointer D1 of the first object in the large object D is invalid data. For pointers of some invalid data that are recorded in the created first deletion log corresponding to the first expired backup, refer to content shown in Table 3.

TABLE 3

| First deletion log | |
|---|---|
| B1 | D1 |

In this embodiment of the present invention, after the foregoing step 421, that is, after the backup server 130 creates the first deletion log, the backup server 130 may send a first expired backup metadata deletion instruction to the object-based storage system 140. The first expired backup metadata deletion instruction includes the metadata object identifier corresponding to the backup metadata of the first expired backup. The first expired backup metadata deletion instruction is used to instruct to delete the backup metadata of the first expired backup. After the backup server 130 sends the first expired backup metadata deletion instruction to the object-based storage system 140, the object-based storage system 140 may delete the backup metadata of the first expired backup based on the first expired backup metadata deletion instruction.

In addition, in this embodiment of the present invention, after the backup server 130 creates the deletion log, the backup server 130 further deletes backup attribute information of the first expired backup. After the backup server 130 deletes the backup attribute information of the first expired backup, remaining backup attribute information stored in the backup server 130 is backup attribute information of unexpired backups. Therefore, after the backup attribute information of the first expired backup is deleted, after a subsequent incremental backup, the backup server 130 may detect a quantity of pieces of all the stored backup attribute information, to detect whether a total quantity of all unexpired backups exceeds the predetermined value.

422. The backup server 130 sends the first deletion log to the object-based storage system 140.

430. After receiving the first deletion log, the object-based storage system 140 stores the first deletion log into the object-based storage system 140.

After storing the first deletion log into the object-based storage system 140, the object-based storage system 140 may send a deletion log storage completion message to the backup server 130, to notify the backup server 130 that the first deletion log has been stored into the object-based storage system 140.

Subsequently, if the virtual machine disk data is further modified, the backup server 130 may further incrementally back up the virtual machine disk data through the steps shown in FIG. 3.

For example, after the incremental backup corresponding to Table 2, if data slices in the first object A1 in the large object A, the first object C1 in the large object C, and the second object E2 in the large object E in the virtual machine disk data are modified, after objects to which modified data slices belong are incrementally backed up, the objects to which the modified data slices belong are stored into a large object F. In this case, backup metadata of the incremental backup is shown in the following Table 4.

TABLE 4

| Pointer of the first object in a large object F | Pointer of the second object in a large object A | Pointer of the third object in a large object A | Pointer of the first object in a large object E | Pointer of the second object in a large object B | Pointer of the second object in a large object F | Pointer of the third object in a large object F |
|---|---|---|---|---|---|---|
| F1 | A2 | A3 | E1 | B2 | F2 | F3 |

After the incremental backup corresponding to Table 4, if detecting that a total quantity of unexpired backups in all backups of the virtual machine disk data in the object-based storage system 140 exceeds the predetermined value, the backup server 130 determines an earliest backup in all the unexpired backups in the object-based storage system 140 as a second expired backup. After determining the second expired backup, the backup server 130 creates a second deletion log of the virtual machine disk data, and stores a pointer of invalid data in the second expired backup into the second deletion log. The second expired backup is an earliest backup in all the unexpired backups of the virtual machine disk data that have been performed in the object-based storage system 140 by a current second moment. Based on the expired backup processing method in this embodiment of the present invention, for a processing manner each time after an expired backup is determined, refer to details on steps 400 to 430 shown in FIG. 4. Specific implementation details are not described herein again.

For example, after the incremental backup corresponding to Table 4, if the incremental backup corresponding to Table 2 is the second expired backup, for pointers of some invalid data that are recorded in the created second deletion log, refer to content shown in the following Table 5.

TABLE 5

| Second deletion log | | |
|---|---|---|
| A1 | C1 | E2 |

For another example, for the incremental backup corresponding to Table 4, if data slices in the second object A2 in the large object A and the third object A3 in the large object A in the virtual machine disk data are modified, after objects to which modified data slices belong are incrementally backed up, the objects to which the modified data slices belong are stored into a large object G. In this case, backup metadata of the incremental backup is shown in the following Table 6.

TABLE 6

| Pointer of the first object in a large object F | Pointer of the first object in a large object G | Pointer of the second object in a large object G | Pointer of the first object in a large object E | Pointer of the second object in a large object B | Pointer of the second object in a large object F | Pointer of the third object in a large object F |
|---|---|---|---|---|---|---|
| F1 | G1 | G2 | E1 | B2 | F2 | F3 |

After the incremental backup corresponding to Table 6, if detecting that a total quantity of unexpired backups in all backups of the virtual machine disk data in the object-based storage system 140 exceeds the predetermined value, the backup server 130 determines an earliest backup in all the unexpired backups in the object-based storage system 140 as a third expired backup. After determining the third expired backup, the backup server 130 creates a third deletion log of the virtual machine disk data, and stores a pointer of invalid data in the third expired backup into the third deletion log. The third expired backup is an earliest backup in all the unexpired backups of the virtual machine disk data that have been performed in the object-based storage system 140 by a current third moment. Based on the expired backup processing method in this embodiment of the present invention, for a processing manner each time after an expired backup is determined, refer to details on steps 400 to 430 shown in FIG. 4. Specific implementation details are not described herein again.

For example, after the incremental backup corresponding to Table 6, if the incremental backup corresponding to Table 4 is the third expired backup, for pointers of some invalid data that are recorded in the created third deletion log, refer to content shown in the following Table 7.

TABLE 7

| Third deletion log | |
|---|---|
| A2 | A3 |

An objective of storing, into the object-based storage system 140, deletion logs respectively corresponding to a plurality of expired backups of the virtual machine disk is to enable a backup system to subsequently determine, based on all the deletion logs, all objects that are in the expired backups and that include invalid data, to process all the objects that include the invalid data. All the objects that include the invalid data may have a large object that includes invalid data and valid data, and may further have a large object that includes only invalid data or an object that is invalid data.

Figure 5:
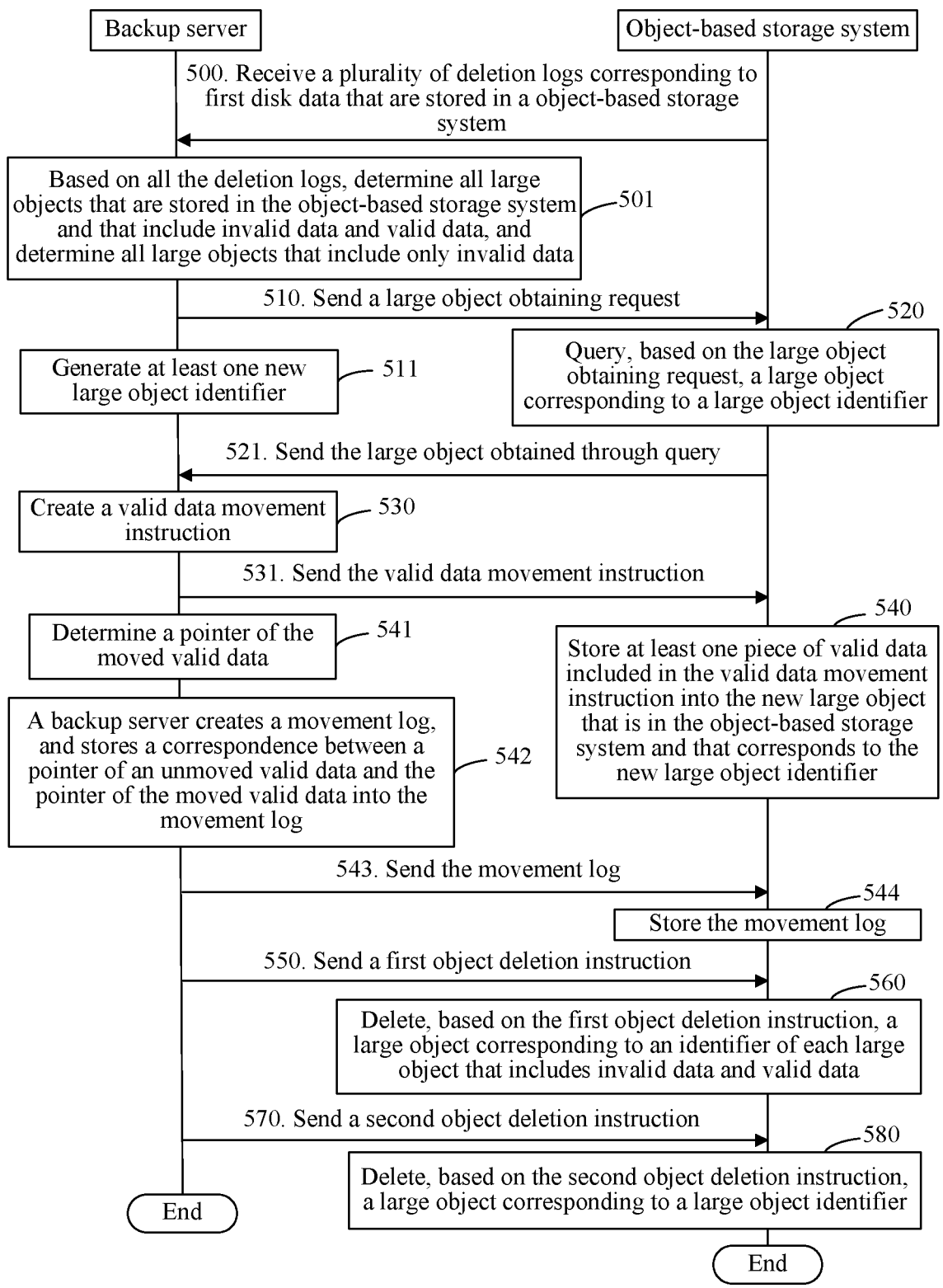
FIG. 5 is a flowchart of a method for deleting expired data by a backup server based on accumulated deletion logs according to an embodiment of the present invention.

After the backup server 130 stores the deletion logs into the object-based storage system 140, when detecting that a deletion condition is met, the backup server 130 starts an expired data deletion procedure based on accumulated deletion logs. The following describes in detail how the backup server 130 deletes expired data based on the accumulated deletion logs. Referring to FIG. 5, FIG. 5 is a flowchart of a method for deleting expired data by a backup server based on accumulated deletion logs according to an embodiment of the present invention. As shown in FIG. 5, the method, provided in this embodiment of the present invention, for deleting expired data by a backup server 130 based on accumulated deletion logs includes the following steps.

500. A backup server 130 receives a plurality of deletion logs corresponding to first disk data that are stored in an object-based storage system 140 and that are sent by the object-based storage system 140.

Before receiving the plurality of deletion logs sent by the object-based storage system 140, the backup server 130 detects whether a deletion condition is met, and if the deletion condition is met, obtains all deletion logs of the virtual machine disk data from the object-based storage system 140. Whether a preset deletion threshold is exceeded is detected, and if the preset deletion threshold is exceeded, the deletion condition is met; or whether a preset deletion time is reached is detected, and if the preset deletion time is reached, the deletion condition is met; or timing is started after the last time the deletion condition is met, whether the timing ends is detected, and if the timing ends, the deletion condition is met. The backup server 130 may detect whether a quantity of log object identifiers of the deletion logs corresponding to the first disk data reaches the preset deletion threshold, to detect whether the plurality of deletion logs corresponding to the first disk data reaches the preset deletion threshold. The plurality of deletion logs corresponding to the first disk data that are stored in the object-based storage system 140 may be, for example, the first deletion log, the second deletion log, and the third deletion log that are described in the foregoing examples.

501. After receiving the plurality of deletion logs sent by the object-based storage system 140, based on all deletion logs, the backup server 130 determines all large objects that are stored in the object-based storage system 140 and that include invalid data and valid data, and determines all large objects that include only invalid data.

In step 501, the backup server 130 determines, based on a quantity of pieces of invalid data in a large object that includes the invalid data and an actual data amount of the large object that includes the invalid data, whether the object is a large object that includes the invalid data and the valid data or a large object that includes only the invalid data.

An implementation in which the backup server 130 determines, based on a quantity of pieces of invalid data in a large object that includes the invalid data and an actual data amount of the large object that includes the invalid data, whether the large object is a large object that includes the invalid data and the valid data or a large object that includes only the invalid data is as follows: The backup server 130 determines, based on the quantity of pieces of the invalid data in the large object that includes the invalid data and an invalid data size, a target data amount of the large object that includes the invalid data, and the backup server 130 obtains an actual data amount of the large object that includes the invalid data. If the target data amount of the large object that includes the invalid data is less than the actual data amount of the large object that includes the invalid data, the large object that includes the invalid data is a large object that includes the invalid data and valid data. If the target data amount of the large object that includes the invalid data is equal to the actual data amount of the large object that includes the invalid data, the large object that includes the invalid data is a large object that includes only the invalid data.

An implementation in which the backup server 130 obtains an actual data amount of the large object that includes the invalid data is as follows: The backup server 130 sends a data amount determining request to the object-based storage system 140. The data amount determining request carries an identifier of the large object that includes the invalid data, and the data amount determining request is used to instruct the object-based storage system 140 to send the actual data amount of the large object that includes the invalid data. After receiving the data amount determining request, the object-based storage system 140 sends data amount attribute information to the backup server 130. The backup server 130 receives the data amount attribute information. The data amount attribute information carries the actual data amount of the large object that includes the invalid data.

For example, based on the foregoing implementation in which the backup server 130 determines, based on a quantity of pieces of invalid data in a large object that includes the invalid data and an actual data amount of the large object that includes the invalid data, whether the large object is a large object that includes the invalid data and the valid data or a large object that includes only the invalid data, large objects that include invalid data and that are determined by the backup server 130 based on the first deletion log, the second deletion log, and the third deletion log that are described in the foregoing examples include the large object B, the large object D, the large object A, the large object C, and the large object E. The large object B is a large object that includes invalid data and valid data, the large object D is a large object that includes only invalid data, the large object A is a large object that includes only invalid data, the large object C is a large object that includes only invalid data, and the large object E is a large object that includes invalid data and valid data.

Alternatively, there are two other manners in which the backup server determines that a large object is a large object that includes valid data and invalid data. Manner 1: After determining a large object that includes invalid data, the backup server requests, from the object-based storage system, pointers of all objects in the large object. If pointers of some objects in the large object are pointers, recorded in deletion logs, of the invalid data of the large object, the backup server determines that the large object is a large object that includes valid data and the invalid data. Manner 2: After determining a large object that includes invalid data, the backup server requests, from the object-based storage system, a quantity of pointers of all objects in the large object. If a quantity of pointers, recorded in deletion logs, of all invalid data of the large object is less than the quantity, requested from the object-based storage system, of the pointers of all the objects in the large object, the backup server determines that the large object is a large object that includes valid data and the invalid data.

Likewise, alternatively, there are two other manners in which the backup server determines that a large object is a large object that includes only invalid data. Manner 1: After determining a large object that includes invalid data, the backup server requests, from the object-based storage system, pointers of all objects in the large object. If the pointers of all the objects in the large object are pointers, recorded in deletion logs, of the invalid data of the large object, the backup server determines that the large object includes only the invalid data. Manner 2: After determining a large object that includes invalid data, the backup server requests, from the object-based storage system, a quantity of pointers of all objects in the large object. If a quantity of pointers, recorded in deletion logs, of all invalid data of the large object is equal to the quantity, requested from the object-based storage system, of the pointers of all the objects in the large object, the backup server determines that the large object is a large object that includes only the invalid data.

In step 501, after all large objects that include invalid data and valid data are determined and after all large objects that include only invalid data are determined, there are different corresponding processing manners, respectively. For details, refer to the following description.

After determining, based on all the deletion logs, all the large objects that include the invalid data and the valid data, the backup server 130 sequentially performs the following steps 510 to 560. To be specific, the backup server 130 obtains, from the object-based storage system 140, all the large objects that include the invalid data and the valid data, stores the valid data in all the large objects that include the invalid data and the valid data into at least one new large object created in the object-based storage system 140, and then instructs the object-based storage system 140 to delete all the large objects that include the invalid data and the valid data. For specific implementation, refer to the following steps 510 to 560.

In addition, after determining, based on all the deletion logs, all the large objects that include only the invalid data, the backup server 130 sequentially performs the following steps 570 and 580. To be specific, the backup server 130 instructs the object-based storage system 140 to delete all the large objects that include only the invalid data. For specific implementation, refer to the following steps 570 and 580.

In this implementation, step 570 and step 510 are not necessarily performed in a particular order.

The following first describes a processing manner after the backup server 130 determines, based on the plurality of deletion logs, all the large objects that include the invalid data and the valid data, and the processing manner specifically includes the following steps 510 to 560.

510. After determining, based on all the deletion logs, at least one large object that is in the object-based storage system 140 and that includes invalid data and valid data, the backup server 130 sends a large object obtaining request to the object-based storage system 140. The large object obtaining request includes an identifier of the large object that includes the invalid data and the valid data.

For example, all large objects that are in all expired backups and that include invalid data and valid data include a first target large object. The large object obtaining request includes an identifier of the first target large object. The first target large object may be either of the large object B and the large object E.

The large object obtaining request includes an identifier of the at least one large object that includes the invalid data and the valid data. For example, if more than one large object that includes invalid data and valid data is determined by the backup server 130 based on deletion logs, there are a plurality of implementations in which the backup server 130 sends a large object obtaining request. For example, the backup server 130 sends a plurality of large object obtaining requests to the object-based storage system 140, to request to obtain a plurality of large objects that include invalid data and valid data. Each large object obtaining request includes an identifier of one large object that includes valid data and invalid data. Alternatively, the backup server 130 sends one large object obtaining request, to request to obtain a plurality of large objects. The large object obtaining request includes identifiers of the plurality of large objects that include valid data and invalid data.

511. The backup server 130 generates at least one new large object identifier after determining the large object that is in the object-based storage system 140 and that includes the invalid data and the valid data. The at least one new large object identifier is in a one-to-one correspondence with at least one new large object. In this implementation, steps 510 and 511 are not necessarily performed in a particular order. In this embodiment, for example, the at least one new large object includes a first new large object.

After determining the large object that is in the object-based storage system 140 and that includes the invalid data and the valid data, the backup server 130 determines a quantity of to-be-created new large object identifiers based on a quantity of pieces of the valid data in the at least one large object that includes the invalid data and the valid data and a quantity of objects that actually can be stored in a large object. The quantity of to-be-created new large object identifiers is a quantity obtained after an operation of 1 plus a rounded quotient of dividing the quantity of pieces of all the valid data in the at least one large object that includes the invalid data and the valid data by the quantity of the plurality of objects that actually can be stored in the large object. For example, there are two large objects that include invalid data and valid data: the large object B and the large object E. B2 in the large object B and E1 in the large object E are valid data. A quantity of pieces of the valid data is 2. If a quantity of objects that actually can be stored in a new large object is 3, a quantity of to-be-created new large object identifiers is 1.

Alternatively, before creating a new large object identifier, the backup server 130 may first sequentially determine, based on a determined valid data pointer sequence, pointers of a plurality of pieces of valid data to be stored into a new large object, and create the new large object identifier when a quantity of the sequentially determined pointers of the plurality of pieces of valid data reaches a quantity of objects that actually can be stored in a large object. For subsequently remaining valid data, the backup server 130 may also sequentially determine, from the subsequently remaining valid data based on the valid data pointer sequence, pointers of a plurality of pieces of valid data to be stored into another new large object, and create another new large object identifier when a quantity of the sequentially determined pointers of the plurality of pieces of valid data reaches the quantity of the plurality of objects that actually can be stored in the large object, and so on, to create a plurality of new large object identifiers.

520. After receiving the large object obtaining request, the object-based storage system 140 queries, based on the large object obtaining request, for a large object corresponding to a large object identifier. For example, the object-based storage system 140 queries for a corresponding first target large object based on a first target large object identifier in the large object obtaining request.

After step 510, step 520 is performed. For example, the corresponding first target large object obtained through query by the object-based storage system 140 based on the first target large object identifier in the large object obtaining request may be the large object B or the large object E.

521. The object-based storage system 140 sends the large object obtained through query to the backup server 130. After step 520, step 521 is performed.

For example, the object-based storage system 140 sends the first target large object obtained through query to the backup server 130. For example, the object-based storage system 140 sends the large object B or the large object E obtained through query to the backup server 130.

530. The backup server 130 creates a valid data movement instruction after receiving the at least one large object that includes the invalid data and the valid data.

The valid data movement instruction includes the new large object identifier and at least one piece of valid data in the at least one large object that includes the invalid data and the valid data. The valid data movement instruction is used to instruct the object-based storage system 140 to store the at least one piece of valid data in the large object that includes the invalid data and the valid data into the new large object corresponding to the new large object identifier.

The valid data movement instruction further includes an identifier of a location of the moved valid data in the new large object. The identifier of the location of the moved valid data in the new large object is used to indicate the location of the moved valid data in the new large object.

After receiving the large object that includes the invalid data and the valid data, the backup server 130 parses the large object that includes the invalid data and the valid data, to determine the valid data in the large object that includes the invalid data and the valid data. The backup server 130 creates the valid data movement instruction after determining the at least one piece of valid data in the at least one large object.

There are a plurality of implementations of the at least one piece of valid data in the valid data movement instruction. In an optional implementation, the at least one piece of valid data in the valid data movement instruction may include at least one piece of valid data in each of two or more large objects that include invalid data and valid data. For example, the at least one piece of valid data in the valid data movement instruction may include all valid data in at least one large object that includes invalid data and valid data and a part or all of valid data in another large object that includes invalid data and the valid data.

A quantity of valid data movement instructions created by the backup server 130 is not limited by this embodiment of this application. For example, the backup server 130 may create at least one valid data movement instruction. To be specific, the backup server 130 not only may create one valid data movement instruction but also may create more valid data movement instructions. At least one piece of valid data in each valid data movement instruction may include a part or all of the valid data in the at least one large object that includes the invalid data and the valid data.

When the at least one piece of valid data in each valid data movement instruction includes a part of the valid data in the at least one large object that includes the invalid data and the valid data, the backup server 130 may send a plurality of valid data movement instructions, to send all the valid data in the large object that includes the invalid data and the valid data to the object-based storage system 140.

The first target large object that includes valid data and invalid data is used as an example to describe an implementation of each valid data movement instruction. For example, the valid data movement instruction includes the first new large object identifier and at least one piece of valid data in the first target large object. The valid data movement instruction is used to instruct the object-based storage system 140 to store the at least one piece of valid data in the first target large object in the valid data movement instruction into the first new large object corresponding to the first new large object identifier. For example, when the first target large object is the large object B, the at least one piece of valid data in the first target large object that is included in the valid data movement instruction may be B2. For example, when the first target large object is the large object E, the at least one piece of valid data in the first target large object that is included in the valid data movement instruction may be E1. The backup server 130 may create two valid data movement instructions, one valid data movement instruction includes the valid data B2, and the other valid data movement instruction includes E1. Alternatively, the backup server 130 may create one valid data movement instruction, and the valid data movement instruction includes two pieces of valid data B2 and E1.

531. Send the valid data movement instruction to the object-based storage system 140.

540. After receiving the valid data movement instruction, the object-based storage system 140 stores at least one piece of valid data included in the valid data movement instruction into a new large object that is in the object-based storage system 140 and that corresponds to the new large object identifier.

After step 540, that is, after the object-based storage system 140 stores the at least one piece of valid data included in the valid data movement instruction into the new large object that is in the object-based storage system 140 and that corresponds to the new large object identifier, the object-based storage system 140 sends valid data storage completion information to the backup server 130, to notify the backup server 130 that all valid data included in the valid data movement instruction has been stored.

After determining, based on all the deletion logs, all the large objects that include the invalid data and the valid data, the backup server 130 stores, through the foregoing steps 510 to 540, all the valid data in all the large objects that include the invalid data and the valid data into the at least one new large object in the object-based storage system 140.

Based on the foregoing steps 510 to 540, after the object-based storage system 140 stores the valid data in all the large objects that include the invalid data and the valid data into the at least one new large object in the object-based storage system 140, steps 541 to 560 are performed subsequently. To be specific, the backup server 130 creates a pointer of the valid data after being moved. The pointer of the valid data after being moved is used to indicate a location, of the valid data after being stored into the new large object, in the new large object. After the backup server 130 creates the pointer of the valid data after being moved, the backup server 130 records a correspondence between a pointer of the valid data before being moved and the pointer of the valid data after being moved, and deletes the large objects that are determined by the backup server 130 based on all the deletion logs and that include the invalid data and the valid data, to delete expired data. For details on a specific process, refer to the following steps 541 to 560.

541. The backup server 130 determines a pointer of the valid data after being moved. Step 541 and step 531 are not necessarily performed in a particular order.

The backup server 130 may determine the pointer of the valid data after being moved after receiving the valid data storage completion information sent by the object-based storage system 140. The pointer of the valid data after being moved is used to indicate the location, of the valid data after being stored into the new large object, in the new large object. The backup server 130 may determine the pointer of the valid data after being moved based on the identifier of the location, of the valid data in the valid data movement instruction created in the foregoing step 530 after being moved, in the new large object.

542. The backup server 130 creates a movement log, and stores, into the movement log, a correspondence between a pointer of the valid data before being moved and the pointer of the valid data after being moved.

In step 542, before creating the movement log, the backup server 130 creates an object identifier of the movement log in advance, and stores a correspondence between a virtual machine disk identifier and the object identifier of the movement log.

After the backup server 130 backs up the virtual machine disk data, a client 110 does not frequently restore the virtual machine disk data. Therefore, in the expired backup processing method provided in this embodiment of the present invention, each time an expired backup is being processed, after valid data in the expired backup is moved into a new large object, a backup system does not update backup metadata respectively corresponding to all unexpired backups, but creates a movement log, and stores a pointer of the valid data after being moved in the expired backup into the movement log, to ensure that when the virtual machine disk data is to be restored subsequently by using a to-be-restored backup in the unexpired backups, backup metadata corresponding to the to-be-restored backup may be determined based on the pointer, recorded in the movement log, of the moved valid data, to obtain virtual machine disk data corresponding to the to-be-restored backup from the object-based storage system 140 based on the backup metadata corresponding to the to-be-restored backup.

The movement log is created after the valid data in the expired backup is moved when the backup system processes the expired backup, so that when an unexpired backup is to be restored subsequently, the backup metadata corresponding to the to-be-restored backup is updated pertinently, complexity of the backup metadata for expired backup processing is reduced, and expired backup processing efficiency is improved.

543. The backup server 130 sends the movement log to the object-based storage system 140.

The backup server 130 may send a movement log storage request to the object-based storage system 140 after storing, into the movement log, the correspondence between the pointer of the valid data before being moved and the pointer of the valid data after being moved. The movement log storage request includes the object identifier of the movement log and the movement log. The movement log storage request is used to instruct the object-based storage system 140 to store the movement log in the movement log storage request into an object corresponding to the object identifier of the movement log.

544. The object-based storage system 140 stores the movement log after receiving the movement log.

After receiving the movement log storage request, the object-based storage system 140 stores the movement log into the object corresponding to the object identifier of the movement log.

After step 544, the object-based storage system 140 sends a large object writing completion message to the backup server 130. An objective of sending the large object writing completion message by the object-based storage system 140 to the backup server 130 is to notify the backup server 130 that the movement log has been stored.

550. Send a first object deletion instruction to the object-based storage system 140. The first object deletion instruction includes an identifier of each large object that is determined by the backup server 130 based on the plurality of deletion logs and that includes invalid data and valid data.

The backup server 130 may send the first object deletion instruction to the object-based storage system 140 after receiving the large object writing completion message.

560. After receiving the first object deletion instruction, the object-based storage system 140 deletes, based on the first object deletion instruction, a large object corresponding to an identifier of each large object that includes invalid data and valid data.

The following describes a processing manner after the backup server 130 determines, based on all the deletion logs, all the large objects that include only the invalid data, and the processing manner specifically includes the following steps 570 and 580.

After determining, based on the plurality of deletion logs, all the large objects that include only the invalid data, the backup server 130 sequentially performs the following steps 570 and 580. To be specific, the backup server 130 instructs the object-based storage system 140 to delete all the large objects that include only the invalid data. For specific implementation, refer to the following steps 570 and 580.

570. The backup server 130 sends a second object deletion instruction to the object-based storage system 140 after determining, based on the plurality of deletion logs, all the large objects that include only the invalid data. The second object deletion instruction includes an identifier of each large object that is determined by the backup server 130 based on the plurality of deletion logs and that includes only invalid data.

580. After receiving the second object deletion instruction, the object-based storage system 140 deletes, based on the second object deletion instruction, a large object corresponding to a large object identifier.

In this implementation, the foregoing steps 510 to 540 describe how the backup system stores, into the object-based storage system 140, the valid data in all the large objects that are determined by the backup server 130 based on all the deletion logs and that include the invalid data and the valid data. A specific implementation method is as follows: The backup server 130 requests and obtains, from the object-based storage system 140, all the large objects that include the invalid data and the valid data, and then the backup server 130 sends, to the object-based storage system 140 for storage, the valid data in all the large objects that include the invalid data and the valid data.

In another implementation, different from the method described in steps 510 to 540 in which the backup system stores the valid data, an embodiment of the present invention further provides another valid data storage method. To be specific, after determining, by using the foregoing method for determining invalid data and valid data, all the large objects that include the invalid data and the valid data, the backup server 130 instructs, by using a multi-part replication technology, the object-based storage system 140 to store the valid data in all the large objects that include the invalid data and the valid data into the at least one new large object created in the object-based storage system 140. Compared with the valid data storage method described in the foregoing steps 510 to 540, in the valid data storage method provided in this embodiment of the present invention, after the backup server 130 determines, based on the plurality of deletion logs, all the large objects that include the invalid data and the valid data, the backup server 130 does not need to request, from the object-based storage system 140, to read all the large objects that include the invalid data and the valid data, but instructs, by using the multi-part replication technology, the object-based storage system 140 to store the valid data in all the large objects that include the invalid data and the valid data into the at least one new large object created in the object-based storage system 140, thereby reducing an interaction procedure between the backup server 130 and the object-based storage system 140, and improving processing performance of the backup system. For a specific implementation of the method, provided in this embodiment of the present invention, for instructing, by using the multi-part replication technology, the object-based storage system 140 to store valid data, refer to a procedure subsequently described in FIG. 6 in which the backup server 130 instructs, by using the multi-part replication technology, the object-based storage system 140 to store valid data.

Figure 6:
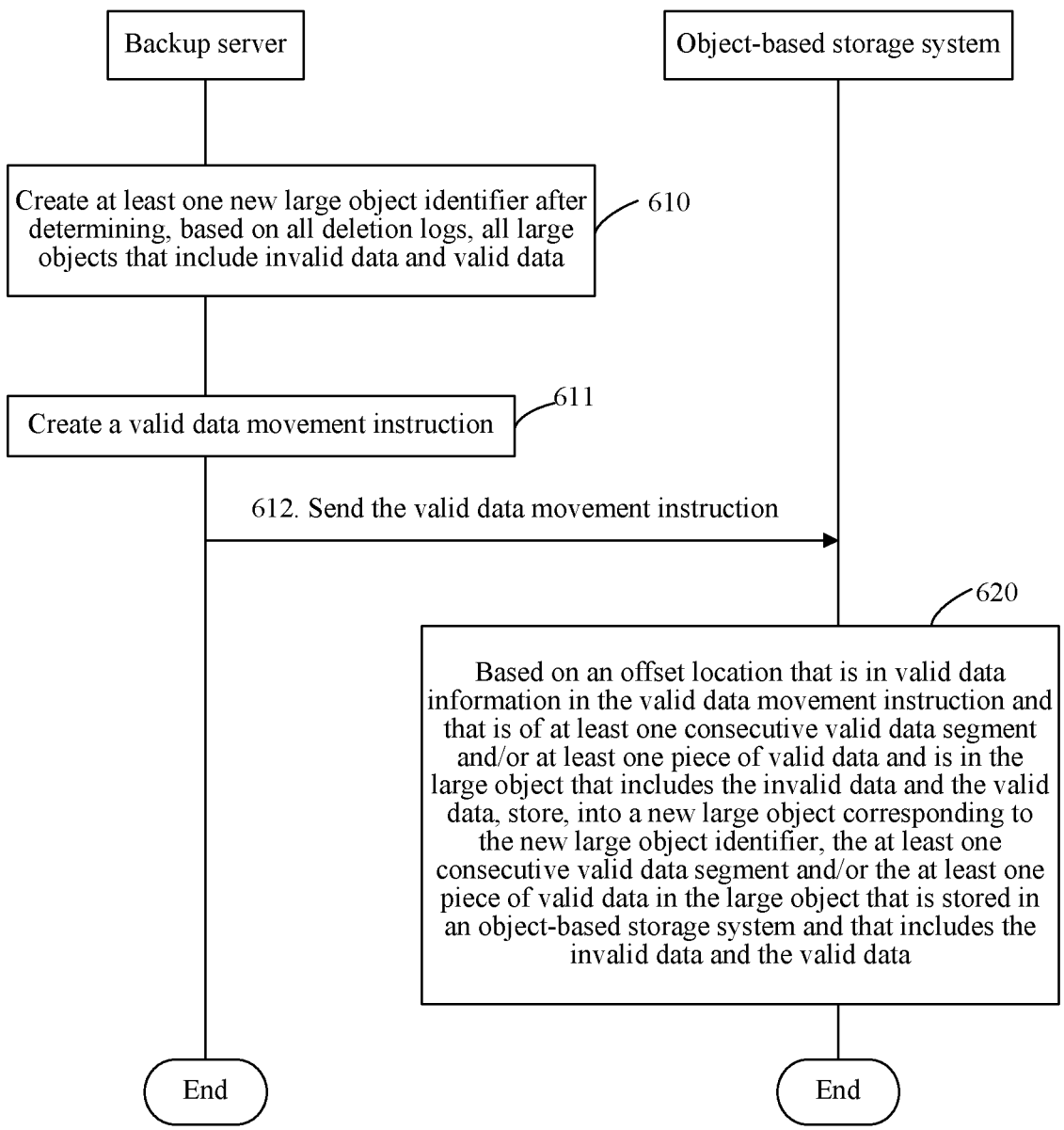
FIG. 6 is a flowchart of a method for instructing, by a backup server by using a multi-part replication technology, an object-based storage system to store valid data according to an embodiment of the present invention.

The following describes in detail a method for instructing, by a backup server 130 by using a multi-part replication technology, an object-based storage system 140 to store valid data. Referring to FIG. 6, FIG. 6 is a flowchart of a method for instructing, by a backup server by using a multi-part replication technology, an object-based storage system to store valid data according to an embodiment of the present invention. As shown in FIG. 6, the method, provided in this embodiment of the present invention, for instructing, by the backup server 130 by using the multi-part replication technology, the object-based storage system 140 to store the valid data includes the following steps.

610. A backup server 130 creates at least one new large object identifier after determining, based on all deletion logs, all large objects that include invalid data and valid data. For details on creating at least one new large object identifier in step 610, refer to the implementation of the foregoing step 511. Specific implementation details are not described herein again.

611. The backup server 130 creates a valid data movement instruction.

The valid data movement instruction includes the new large object identifier and valid data information respectively corresponding to at least one large object that includes valid data and invalid data. The valid data information includes an offset location, of each of at least one consecutive valid data segment in the large object that includes the invalid data and the valid data, in the large object that includes the invalid data and the valid data, and/or an offset location, of each of at least one piece of valid data in the large object that includes the invalid data and the valid data, in the large object that includes the invalid data and the valid data.

Before step 611, the backup server 130 may determine, based on step 501, a plurality of pieces of valid data in all the large objects that are stored in the object-based storage system 140 and that include the invalid data and the valid data, and determine offset locations, of the valid data, in the large objects that include the invalid data and the valid data.

The backup server 130 may create the valid data movement instruction based on the offset locations of the valid data that are determined before the foregoing step 611 and that are in the large objects that include the invalid data and the valid data.

If the valid data information includes the offset location, of each of the at least one piece of valid data in the large object that includes the invalid data and the valid data, in the large object that includes the invalid data and the valid data, the at least one piece of valid data may be a plurality of pieces of non-consecutive valid data in the large object that includes the invalid data and the valid data.

If the valid data information includes the offset location, of each of the at least one consecutive valid data segment in the large object that includes the invalid data and the valid data, in the large object that includes the invalid data and the valid data, the valid data movement instruction is used to instruct the object-based storage system 140 to store, based on the valid data information, the at least one consecutive valid data segment stored in the object-based storage system 140 into a new large object corresponding to the new large object identifier.

There are two representation manners of the offset location, of each consecutive valid data segment, in the large object that includes the invalid data and the valid data. The following separately describes the two representation manners of the offset location, of each consecutive valid data segment, in the large object that includes the invalid data and the valid data.

A first representation manner of the offset location, of each consecutive valid data segment, in the large object that includes the invalid data and the valid data is a start location, of each consecutive valid data segment, in the large object that includes the invalid data and the valid data, and a size of each consecutive valid data segment. The size of each consecutive valid data segment is determined based on a quantity of pieces of valid data included in each consecutive valid data segment. Each piece of valid data is one object. Because a quantity of data slices included in each object is fixed, a size of each object is fixed. In this way, the backup server 130 may determine the size of each consecutive valid data segment based on the object size and the quantity of pieces of valid data included in each consecutive valid data segment. The size of each consecutive valid data segment is a product of the object size and the quantity of pieces of valid data included in each consecutive valid data segment. The start location, of each consecutive valid data segment, in the large object that includes the invalid data and the valid data is determined based on a start location, of the first piece of valid data in each consecutive valid data segment, in the large object that includes the invalid data and the valid data. If the first piece of valid data in a consecutive valid data segment is the $j^{th}$ object in the large object that includes the invalid data and the valid data, where j is an integer greater than 0, a start location, of the first piece of valid data in the consecutive valid data segment, in the large object that includes the invalid data and the valid data is a product of (j−1) and the object size. For example, the first piece of valid data in a consecutive valid data segment is the second object in the large object that includes the invalid data and the valid data. If the object size is 16 M, the start location of the first piece of valid data in the consecutive valid data segment is a product of (2−1) and 16 M, that is, the start location of the first piece of valid data in the consecutive valid data segment is 16 M. Therefore, a start location of the consecutive valid data segment is 16 M.

A second representation manner of the offset location, of each consecutive valid data segment, in the large object that includes the invalid data and the valid data is a start location and an end location, of each consecutive valid data segment, in the large object that includes the invalid data and the valid data. For the start location, of each consecutive valid data segment, in the large object that includes the invalid data and the valid data, refer to the detailed description in the first representation manner. Details are not described herein again. The end location, of each consecutive valid data segment, in the large object that includes the invalid data and the valid data is determined based on an end location, of the last piece of valid data in each consecutive valid data segment, in the large object that includes the invalid data and the valid data. If the last piece of valid data in a consecutive valid data segment is the $n^{th}$ piece of valid data in the large object that includes the invalid data and the valid data, where n is an integer greater than 0, an end location, of the last piece of valid data in the consecutive valid data segment, in the large object that includes the invalid data and the valid data is a product of n and the object size.

If the valid data information includes the offset location, each of the at least one piece of valid data in the large object that includes the invalid data and the valid data, in the large object that includes the invalid data and the valid data, there are two representation forms of the offset location, of the at least one piece of valid data, in the large object that includes the invalid data and the valid data. The following separately describes the two representation forms.

A first representation form of the offset location, of each of the at least one piece of valid data, in the large object that includes the invalid data and the valid data is a start location, of each piece of valid data, in the large object that includes the invalid data and the valid data, and a valid data size. A piece of valid data is one object, and therefore the valid data size is fixed. A manner of determining the offset location, of each piece of valid data, in the large object that includes the invalid data and the valid data is as follows: If the valid data is the $k^{th}$ object in the large object that includes the invalid data and the valid data, where k is an integer greater than 0, the start location of the valid data is a product of (k−1) and the object size. For example, the valid data is the fourth object in the large object that includes the invalid data and the valid data. If the object size is 16 M, the start location of the valid data is a product of (4−1) and 16 M. To be specific, the start location of the valid data is 48 M.

A second representation form of the offset location, of each of the at least one piece of valid data, in the large object that includes the invalid data and the valid data is a start location and an end location, of each piece of valid data, in the large object that includes the invalid data and the valid data. For the start location, of each piece of valid data, in the large object that includes the invalid data and the valid data, refer to the detailed description in the first representation manner. Details are not described herein again. A manner of determining the end location, of each piece of valid data, in the large object that includes the invalid data and the valid data is as follows: If the valid data is the $t^{th}$ object in the large object that includes the invalid data and the valid data, where t is an integer greater than 0, the end location of the valid data is a product of t and the object size. For example, the valid data is the fourth object in the large object that includes the invalid data and the valid data. If the object size is 16 M, the end location of the valid data is a product of 4 and 16 M. To be specific, the start location of the valid data is 64 M.

The valid data movement instruction may include valid data information respectively corresponding to a plurality of the large objects that include the valid data and the invalid data. Valid data information corresponding to each large object includes an offset location, of each of at least one consecutive valid data segment, in the large object that includes invalid data and valid data, and/or an offset location, of each of at least one piece of valid data, in the large object that includes invalid data and valid data.

The backup server 130 may create at least one valid data movement instruction, and valid data information in each valid data movement instruction includes an offset location of a part of valid data in the large object that includes the invalid data and the valid data. Therefore, the backup server 130 may send a plurality of valid data movement instructions to send offset locations of all the valid data in the large objects that include the invalid data and the valid data to the object-based storage system 140. The part of valid data in the large object that includes the invalid data and the valid data may be a part of a consecutive valid data segment and/or a part of valid data in the large object that includes the invalid data and the valid data. The offset location of the part of valid data in the large object that includes the invalid data and the valid data includes an offset location, of each consecutive valid data segment in the part of the consecutive valid data segment, in the large object that includes the invalid data and the valid data, and/or an offset location, of each piece of valid data in the part of valid data, in the large object that includes the invalid data and the valid data.

612. The backup server 130 sends the valid data movement instruction to the object-based storage system 140.

620. After receiving the valid data movement instruction, based on an offset location that is in valid data information in the valid data movement instruction and that is of at least one consecutive valid data segment and/or at least one piece of valid data and is in the large object that includes the invalid data and the valid data, the object-based storage system 140 stores, into a new large object corresponding to the new large object identifier, the at least one consecutive valid data segment and/or the at least one piece of valid data in the large object that is stored in the object-based storage system 140 and that includes the invalid data and the valid data.

After receiving the valid data movement instruction, the object-based storage system 140 first queries, based on the new large object identifier in the valid data movement instruction, whether the new large object corresponding to the new large object identifier is created. If the new large object corresponding to the new large object identifier is not created, the object-based storage system 140 creates a new large object based on the new large object identifier, and then based on the offset location that is in valid data information in the valid data movement instruction and that is of the at least one consecutive valid data segment and/or the at least one piece of valid data and is in the large object that includes the invalid data and the valid data, stores, into the new large object corresponding to the new large object identifier, the at least one consecutive valid data segment and/or the at least one piece of valid data in the large object that is stored in the object-based storage system 140 and that includes the invalid data and the valid data.

After the object-based storage system 140 receives the valid data movement instruction, if determining, based on the new large object identifier, that the new large object corresponding to the new large object identifier is created, based on the offset location that is in valid data information in the valid data movement instruction and that is of the at least one consecutive valid data segment and/or the at least one piece of valid data and is in the large object that includes the invalid data and the valid data, the object-based storage system 140 stores, into the new large object corresponding to the new large object identifier, the at least one consecutive valid data segment and/or the at least one piece of valid data in the large object that is stored in the object-based storage system 140 and that includes the invalid data and the valid data.

After determining, based on all the deletion logs, all the large objects that include the invalid data and the valid data, the backup server 130 stores, through the foregoing steps 610 to 620, all the valid data in all the large objects that include the invalid data and the valid data into at least one new large object in the object-based storage system 140.

Compared with the valid data storage method described in the foregoing steps 510 to 540, based on the method, shown in FIG. 6, for instructing, by the backup server 130 by using the multi-part replication technology, the object-based storage system 140 to store valid data, after the backup server 130 determines, based on the plurality of deletion logs, all the large objects that include the invalid data and the valid data, the backup server 130 does not need to request to read, from the object-based storage system 140, all the large objects that include the invalid data and the valid data, but instructs, by using the multi-part replication technology, the object-based storage system 140 to store the valid data in all the large objects that include the invalid data and the valid data into the at least one new large object in the object-based storage system 140, thereby reducing an interaction procedure between the backup server 130 and the object-based storage system 140, and improving processing performance of a backup system.

After step 620 shown in FIG. 6, that is, after the object-based storage system 140 stores the valid data in all the large objects that include the invalid data and the valid data into the at least one new large object in the object-based storage system 140, steps 541 to 560 are performed subsequently. To be specific, the backup server 130 creates a pointer of the valid data after being moved. The pointer of the valid data after being moved is used to indicate a location, in the new large object, of the valid data after being stored into the new large object. After the backup server 130 creates the pointer of the valid data after being moved, the backup server 130 records a correspondence between a pointer of unmoved valid data and the pointer of the valid data after being moved, and deletes the large objects that are determined by the backup server 130 based on the plurality of deletion logs and that include the invalid data and the valid data, to delete expired data. For details on a specific process, refer to steps 541 to 560. Details are not described herein again.

After the backup system backs up the virtual machine disk data, if a client 110 needs to restore the virtual machine disk data, the client 110 sends a data restoration request to the backup server 130. After receiving the data restoration request, the backup server 130 performs a restoration procedure to restore the virtual machine disk data. When restoring the virtual machine disk data, the backup server 130 obtains, based on a to-be-restored backup identifier included in the data restoration request, virtual machine disk data corresponding to the to-be-restored backup, and restores the virtual machine disk data by using the virtual machine disk data corresponding to the to-be-restored backup. The to-be-restored backup is an unexpired backup.

After the backup server 130 backs up the virtual machine disk data, the client 110 does not frequently restore the virtual machine disk data. Therefore, in the expired backup processing method provided in this embodiment of the present invention, each time an expired backup is being processed, after valid data in the expired backup is moved into a new large object, the backup system does not update backup metadata respectively corresponding to all unexpired backups, but creates a movement log, and stores a pointer of the valid data after being moved in the expired backup into the movement log, to ensure that when the virtual machine disk data is to be restored subsequently by using the to-be-restored backup in the unexpired backups, backup metadata corresponding to the to-be-restored backup may be determined based on the pointer, recorded in the movement log, of the moved valid data, to obtain the virtual machine disk data corresponding to the to-be-restored backup from the object-based storage system 140 based on the backup metadata corresponding to the to-be-restored backup. The following describes, with reference to FIG. 7A and FIG. 7B, a method, provided in an embodiment of the present invention, of how to restore virtual machine disk data by using a movement log.

Figure 7A:
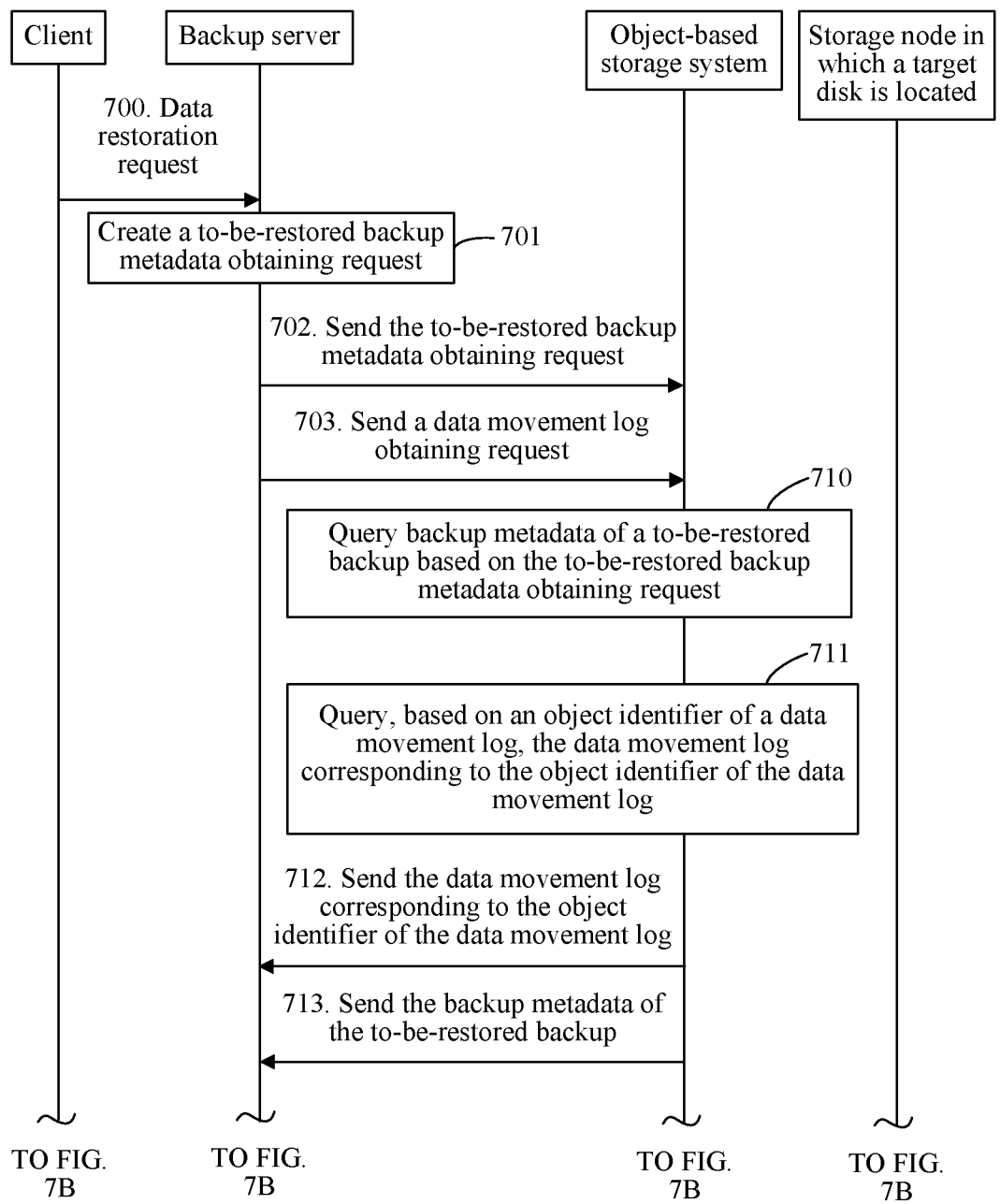
FIG. 7A and FIG. 7B are a flowchart of a method for restoring virtual machine disk data according to an embodiment of the present invention.
Figure 7B:
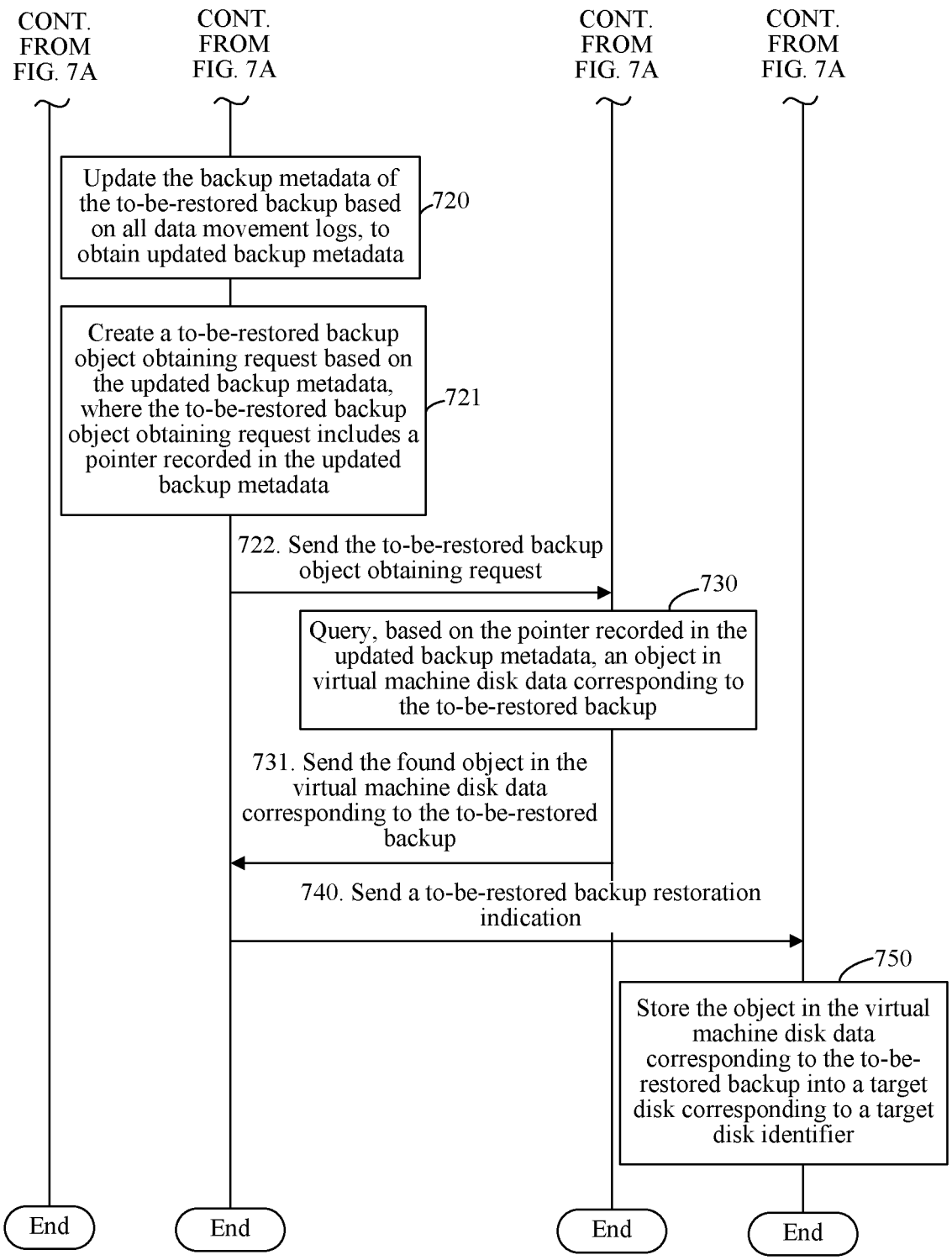

Referring to FIG. 7A and FIG. 7B, FIG. 7A and FIG. 7B are a flowchart of a method for restoring virtual machine disk data according to an embodiment of the present invention. As shown in FIG. 7A and FIG. 7B, the method, provided in this embodiment of the present invention, for restoring virtual machine disk data includes the following steps.

700. A backup server 130 receives a data restoration request sent by a client 110.

The data restoration request includes a target disk identifier, a virtual machine disk identifier, and a to-be-restored backup identifier corresponding to a to-be-restored backup of virtual machine disk data. The data restoration request is used to instruct to restore the virtual machine disk data into a target disk based on the to-be-restored backup corresponding to the to-be-restored backup identifier. The virtual machine disk data includes consecutive data slices. A virtual machine disk data backup corresponding to the to-be-restored backup identifier in the data restoration request is the to-be-restored backup.

The target disk identifier may be, for example, Chinese characters such as "shengchan shuju" or "yewu shuju", or may be a letter, a number, or another symbol, or may be a combination of a letter, a number, or another symbol. Specific implementation is not limited by this embodiment.

The target disk may be a virtual machine disk that is previously used to store the virtual machine disk data, or may be another disk. The target disk may be deployed in a storage node 120 in which the virtual machine disk is located or in the backup server 130, or may be deployed in another physical device, for example, another storage device, which may be a storage array.

In step 700, the backup server 130 may receive the data restoration request sent by the client 110. The to-be-restored backup identifier in the data restoration request may be implemented by using a backup time point identifier or a backup version identifier or a backup times identifier.

701. The backup server 130 creates a to-be-restored backup metadata obtaining request. The to-be-restored backup metadata obtaining request includes the virtual machine disk identifier and the to-be-restored backup identifier.

702. The backup server 130 sends the to-be-restored backup metadata obtaining request to an object-based storage system 140.

The backup server 130 prestores a correspondence between the to-be-restored backup identifier and a metadata object identifier corresponding to backup metadata of the to-be-restored backup. Before sending the metadata obtaining request, the backup server 130 first queries, based on the correspondence between the to-be-restored backup identifier and the metadata object identifier corresponding to the backup metadata of the to-be-restored backup, the metadata object identifier corresponding to the backup metadata of the to-be-restored backup, and then creates the to-be-restored backup metadata obtaining request based on the metadata object identifier corresponding to the backup metadata of the to-be-restored backup. The metadata obtaining request includes the metadata object identifier corresponding to the backup metadata of the to-be-restored backup, and the to-be-restored backup metadata obtaining request is used to instruct the object-based storage system 140 to obtain the backup metadata of the to-be-restored backup based on the metadata object identifier corresponding to the backup metadata of the to-be-restored backup.

703. The backup server 130 sends a movement log obtaining request to the object-based storage system 140. The movement log obtaining request includes an object identifier of a movement log. The movement log obtaining request is used to instruct the object-based storage system 140 to send all movement logs of the virtual machine disk. The movement logs are stored in the object-based storage system 140 in an object-based storage manner.

The backup server 130 prestores a correspondence between the virtual machine disk identifier and the object identifier of the movement log. The backup server 130 queries the object identifier of the movement log based on the correspondence between the virtual machine disk identifier and the object identifier of the movement log.

Steps 703 and 702 are not necessarily performed in a particular order.

710. The object-based storage system 140 queries backup metadata of a to-be-restored backup based on the to-be-restored backup metadata obtaining request.

711. The object-based storage system 140 queries, based on an object identifier of a movement log, the movement log corresponding to the object identifier of the movement log.

Steps 711 and 710 are not necessarily performed in a particular order.

712. The object-based storage system 140 sends the movement log corresponding to the object identifier of the movement log to the backup server 130.

Steps 712 and 710 are not necessarily performed in a particular order.

713. The object-based storage system 140 sends the backup metadata of the to-be-restored backup to the backup server 130.

Steps 713 and 712 are not necessarily performed in a particular order. In addition, steps 713 and 711 are not necessarily performed in a particular order.

720. After receiving the backup metadata of the to-be-restored backup and all movement logs of a virtual machine disk that are sent by the object-based storage system 140, the backup server 130 updates the backup metadata of the to-be-restored backup based on all the movement logs, to obtain modified backup metadata.

In the expired backup processing method provided in the foregoing embodiments of the present invention, after processing an expired backup whose backup type is an incremental backup, a backup system does not update backup metadata of an unexpired backup. Therefore, when the backup server 130 restores the virtual machine disk data, after receiving all the movement logs created based on the expired backup processing method provided in the embodiments of the present invention, the backup server 130 needs to update the backup metadata of the to-be-restored backup based on pointers, recorded in all the movement logs, of moved valid data.

When the backup server 130 updates the backup metadata of the to-be-restored backup based on all the movement logs, the backup server 130 modifies a pointer that is in the backup metadata and that is the same as a pointer, recorded in the movement log, of the unmoved valid data. A modified pointer is the pointer, recorded in the movement log and corresponding to the same pointer of the valid data before being moved, of the moved valid data.

721. After obtaining the modified backup metadata corresponding to the to-be-restored backup, the backup server 130 creates a to-be-restored backup object obtaining request based on the modified backup metadata. The to-be-restored backup object obtaining request includes a pointer recorded in the modified backup metadata.

After obtaining the modified backup metadata by updating the backup metadata of the to-be-restored backup and before creating a to-be-restored backup object obtaining request, the backup server 130 first sequentially determines a plurality of consecutive pointers based on a sequence of pointers recorded in the modified backup metadata. A plurality of objects corresponding to the plurality of consecutive pointers belong to a same large object. Then the backup server 130 creates the to-be-restored backup object obtaining request. The to-be-restored backup object obtaining request includes the plurality of consecutive pointers. The to-be-restored object obtaining request is used to instruct the object-based storage system 140 to query, based on the to-be-restored backup object obtaining request, a plurality of objects in a same large object in the to-be-restored backup. If pointers of a plurality of objects in a same large object are inconsecutive in the backup metadata corresponding to the to-be-restored backup, the backup server 130 needs to create a plurality of to-be-restored backup object obtaining requests. Each to-be-restored backup object obtaining request includes only a plurality of consecutive pointers or one independent pointer.

722. The backup server 130 sends the to-be-restored backup object obtaining request to the object-based storage system 140.

730. After receiving the to-be-restored backup object obtaining request, the object-based storage system 140 queries, based on a pointer recorded in the modified backup metadata, an object in virtual machine disk data corresponding to the to-be-restored backup.

731. The object-based storage system 140 sends the found object in the virtual machine disk data corresponding to the to-be-restored backup.

740. After receiving the object in the virtual machine disk data corresponding to the to-be-restored backup, the backup server 130 sends a to-be-restored backup restoration indication to a storage node 120 in which a target disk corresponding to the target disk identifier is located. The to-be-restored backup restoration indication includes the object in the virtual machine disk data corresponding to the to-be-restored backup and the target disk identifier.

750. After receiving the object in the virtual machine disk data corresponding to the to-be-restored backup, the storage node 120 in which the target disk is located stores the object in the virtual machine disk data corresponding to the to-be-restored backup into the target disk corresponding to the target disk identifier.

When an expired backup is being processed, valid data in different large objects is stored into a same new large object, and a pointer in backup metadata of an unexpired backup is not modified. The to-be-restored backup is also an unexpired backup. Therefore, based on the virtual machine disk data restoration method shown in FIG. 7A and FIG. 7B, after the backup metadata of the to-be-restored backup is updated through step 720, pointers of moved valid data belonging to a same new large object are not necessarily consecutive in the modified backup metadata corresponding to the to-be-restored backup. Therefore, based on the foregoing implementation for creating a to-be-restored object obtaining request based on consecutive pointers in the foregoing step 721, the backup server 130 needs to create a plurality of to-be-restored backup object obtaining requests, and send the plurality of to-be-restored backup object obtaining requests to the object-based storage system 140. This increases interactions between the backup server 130 and the object-based storage system 140, and consumes transmission resources between the backup server 130 and the object-based storage system 140. Therefore, an embodiment of the present invention further provides a method for arranging modified backup metadata corresponding to a to-be-restored backup, that is, arranging a sequence of all pointers in the modified backup metadata, to arrange together a plurality of pointers corresponding to a plurality of objects belonging to a same large object. In this embodiment of the present invention, there are two specific implementations for arranging modified backup metadata corresponding to a to-be-restored backup. The following separately describes the two methods for arranging modified backup metadata.

A first implementation for arranging modified backup metadata corresponding to a to-be-restored backup is as follows: A backup server 130 determines, based on modified backup metadata, a plurality of pointers corresponding to a plurality of objects belonging to a same large object; stores, into a first storage space to which a consecutive address segment points, the plurality of pointers corresponding to the plurality of objects belonging to the same large object; and stores all pointers in the modified backup metadata into a second storage space to which a consecutive address segment points. The second storage space includes the first storage space.

For example, the backup server 130 sequentially determines a plurality of pointers corresponding to a plurality of objects included in each of a plurality of large objects; and stores, into one first storage space, the plurality of pointers corresponding to the plurality of objects included in each large object, to store, by using a plurality of first storage spaces, a plurality of pointers corresponding to all objects in the plurality of large objects. A plurality of consecutive address segments corresponding to the plurality of first storage spaces may be mutually consecutive or inconsecutive. When addresses corresponding to any two of the plurality of first storage spaces are consecutive, a plurality of pointers stored in the any two first storage spaces do not include an independent pointer. In other words, there are no pointers corresponding to objects that do not belong to a same large object. When the plurality of consecutive address segments corresponding to the plurality of first storage spaces are mutually inconsecutive, an independent pointer is arranged between a plurality of pointers stored in the plurality of first storage spaces. In other words, there are pointers that do not belong to a same large object, and objects respectively corresponding to the independent pointer and another pointer adjacent to the independent pointer do not belong to a same large object.

For another example, the backup server 130 may determine a plurality of pointers corresponding to a plurality of objects belonging to a same large object, and determine a plurality of independent pointers corresponding to a plurality of independent objects that do not belong to a same large object. Then the backup server 130 stores, into a first storage space to which a consecutive address segment points, the plurality of pointers corresponding to the plurality of objects belonging to the same large object, and stores, into a third storage space to which a consecutive address segment, the plurality of independent pointers corresponding to the plurality of independent objects that do not belong to the same large object. An end address of the first storage space and a start address of the third storage space are consecutive, or a start address of the first storage space and an end address of the third storage space are consecutive. The second storage space includes the first storage space and the third storage space. If there are a plurality of large objects, the second storage space includes the plurality of first storage spaces.

A second implementation for arranging modified backup metadata corresponding to a to-be-restored backup is as follows: Based on modified backup metadata, the backup server 130 determines a plurality of pointers corresponding to a plurality of objects belonging to a same large object, creates a first index, and stores a correspondence between the first index and the plurality of pointers corresponding to the plurality of objects belonging to the same large object; and determines a plurality of independent pointers corresponding to a plurality of independent objects that do not belong to a same large object, creates a second index, and stores a correspondence between the second index and the plurality of independent pointers corresponding to the plurality of independent objects that do not belong to the same large object. If there are a plurality of large objects, there are a plurality of first indexes, and a quantity of the first indexes is the same as a quantity of the large objects. If there are a plurality of independent pointers, there are a plurality of second indexes, and a quantity of the second indexes is the same as a quantity of the independent pointers. All the first indexes and all the second indexes are stored in a storage space to which a consecutive address segment points.

An embodiment of the present invention further provides a different data backup method. In the data backup method provided in this embodiment of the present invention, a specific implementation for backing up virtual machine disk data respectively corresponding to at least one virtual machine disk into an object-based storage system 140 includes the following steps.

After obtaining a plurality of consecutive data slices of a virtual machine disk to be backed up into an object-based storage system 140, a backup server 130 determines, based on arrangement locations, of the data slices, in virtual machine disk data, a first data set including a plurality of consecutive data slices consistent with a predetermined quantity.

After determining the first data set including the plurality of consecutive data slices consistent with the predetermined quantity, the backup server 130 calculates a weak hash value of the data set, creates a new large object identifier, and stores a correspondence between the new large object identifier and the weak hash value.

After the backup server 130 creates the new large object identifier, the backup server 130 sends a first data set storage instruction to the object-based storage system 140. The first data set storage instruction includes the first data set and the new large object identifier. The first data set storage instruction is used to instruct the object-based storage system 140 to store the first data set into a new large object corresponding to the new large object identifier.

After the backup server 130 sends the first data set storage instruction to the object-based storage system 140 for storage, the object-based storage system 140 stores the first data set into the new large object corresponding to the new large object identifier.

Subsequently, when needing to store second data set into the object-based storage system 140, the backup server 130 first calculates a weak hash value of the second data set, then detects whether the object-based storage system 140 stores a data set having a weak hash value similar to that of the second data set, and if the data set is stored, queries an identifier of a new large object to which the data set having the weak hash value similar to that of the second data set belongs. The backup server 130 detects whether the new large object to which the data set having the weak hash value similar to that of the another second data set belongs reaches a predefined size. If detecting that the predefined size is not reached, the backup server 130 sends second data set storage instruction to the object-based storage system 140. The second data set storage instruction includes the second data set and the identifier of the new large object to which the data set having the weak hash value similar to that of the second data set belongs.

After receiving the another second data set storage instruction, the object-based storage system 140 stores the second data set into the new large object to which the data set having the weak hash value similar to that of second data set belongs. For example, the data set having the weak hash value similar to that of the second data set may be the first data set.

The following describes a structure of a backup server according to an embodiment of the present invention. The backup server has a function for implementing the backup server 130 in the foregoing system embodiment, and the function may be implemented by hardware running corresponding software.

Figure 8:
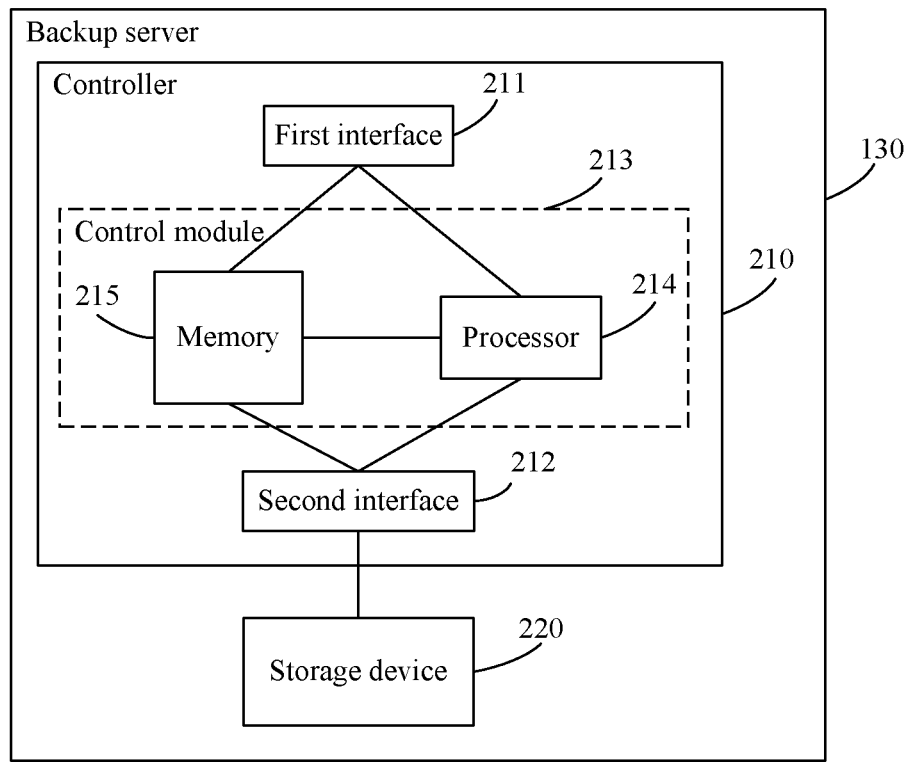
FIG. 8 is a structural diagram of a backup server according to an embodiment of the present invention.

Referring to FIG. 8, FIG. 8 is a structural diagram of a backup server according to an embodiment of the present invention. As shown in FIG. 8, the backup server 130 includes a controller 210 and a storage device 220. The controller 210 is connected to the storage device 220. The backup server 130 shown in FIG. 8 may be applied to the storage system shown in FIG. 1. The storage device 220 is configured to provide a storage service for the controller 210.

The controller 210 is configured to: when receiving a data backup request sent by a client 110, or determining that a preset time is reached, fully or incrementally back up data in a disk of a storage node 120 into an object-based storage system 140, and create and store backup metadata and backup attribute information. The full backup means backing up all data in the disk of the storage node 120 into the storage system. The incremental backup means backing up modified data in the disk of the storage node 120 into the object-based storage system. The backup metadata is used to indicate a location, of each object in disk data, in the disk data. The backup metadata may record an identifier and a pointer of each object included in the disk data, and record the pointer of each object based on a sequence of objects in the disk. The backup attribute information includes a backup identifier and a backup time point of a backup and an identifier of the backup metadata. After creating the backup attribute information, the controller 210 further stores a correspondence between a disk identifier of the disk of the storage node 120 and the backup attribute information.

Usually, the data backup request sent by the client 110 needs to include a disk identifier of a disk requiring a backup, and the controller 210 fully or incrementally backs up, into the object-based storage system 140, data in the disk indicated by the disk identifier. For specific full backup and incremental backup processes, refer to descriptions about that the backup server 130 implements the full backup and the incremental backup in the foregoing method embodiments. Details are not described herein again.

After the disk data in the disk is fully or incrementally backed up, increasing backups are generated in the system. To save a storage space of the system, backups in the storage system need to be managed. The backup server 130 deletes an expired backup as required.

The controller 210 is configured to: when detecting that a total quantity of pieces of all backup attribute information of the disk exceeds a predetermined value, determine an earliest backup as an expired backup based on backup time points in all the backup attribute information. After determining the expired backup, the controller 210 identifies invalid data in the expired backup by using backup metadata of the expired backup and backup metadata of a backup next to the expired backup, creates a deletion log, and stores a pointer of the invalid data in the expired backup into the deletion log. After creating the deletion log, the controller 210 is further configured to delete backup attribute information of the expired backup, and create and store a correspondence between the disk identifier and an identifier of the deletion log. The invalid data is an object that is in the expired backup and that includes a data slice modified of the backup next to the expired backup.

After detecting whether a deletion condition is met, the controller 210 obtains, based on the correspondence between the disk identifier and the identifier of the deletion log, a plurality of deletion logs corresponding to the disk data. The deletion condition may be as follows: A quantity of the plurality of deletion logs corresponding to the disk data reaches a preset deletion threshold; or a preset deletion time is reached; or timing is started after the last time the deletion condition is met, and the timing ends.

The controller 210 is further configured to: based on the plurality of deletion logs, determine a target large object that is stored in the object-based storage system 140 and that includes valid data and the invalid data, and determine a large object that includes only the invalid data. The valid data is an object that is in the expired backup and that includes a data slice not modified of the backup next to the expired backup.

After determining the target large object that is stored in the object-based storage system 140 and that includes the valid data and the invalid data, the controller 210 is further configured to send a data migration indication and an object deletion indication to the object-based storage system 140. The data migration indication is used to instruct the object-based storage system 140 to migrate the valid data in the target large object to another large object. The object deletion indication is used to instruct the object-based storage system 140 to delete the target large object. After determining the large object that includes only the invalid data, the controller 210 is further configured to send an object deletion indication to the object-based storage system 140. The object deletion indication is used to instruct the object-based storage system 140 to delete the large object that includes only the invalid data.

If valid data in a large object is moved into another large object, a pointer of the valid data in the large object is modified. To avoid updating pointers, recorded in backup metadata respectively corresponding to all other backups, of valid data in the large object, a correspondence between a pointer of the valid data in the large object before being moved and a pointer of the valid data after being moved is recorded by using a movement log, so that when a particular backup needs to be accessed subsequently, it is determined whether a pointer the same as the pointer, recorded in the movement log, of the unmoved valid data exists in backup metadata of the particular backup. If the pointer exists, the same pointer in the backup metadata of the backup is modified to the pointer of the valid data after being moved, thereby avoiding updating, after the valid data is moved, the backup metadata respectively corresponding to all the other backups.

After moving valid data in a large object into another large object, the controller 210 is further configured to create a movement log, and store, into the movement log, a correspondence between a pointer of the valid data before being moved and a pointer of the valid data after being moved. In this way, when subsequently accessing the moved valid data in the disk data by using backup metadata of an unexpired backup, the controller 210 updates the backup metadata of the unexpired backup based on the correspondence, stored in the movement log, between the pointer of the valid data before being moved and the pointer of the valid data after being moved. During an update of the backup metadata of the unexpired backup, a pointer that is in the backup metadata of the unexpired backup and that is the same as the pointer, recorded in the movement log, of the unmoved valid data is modified. A modified pointer is the pointer, recorded in the movement log, of the moved valid data.

For example, after receiving a data restoration request sent by the client 110, and determining a to-be-restored backup from all unexpired backups, the controller 210 modifies backup metadata of the to-be-restored backup based on a movement log, obtains, based on modified backup metadata, all objects included in disk data, and then restores the disk data into a target disk.

In the backup server 130 shown in FIG. 8, the controller 210 includes a first interface 211, a second interface 212, and a control module 213. The control module 213 is separately connected to the first interface 211 and the second interface 212. The first interface 211 is configured to communicate with the client 110. The second interface 212 is configured to communicate with the storage device 220 and the object-based storage system 140.

The control module 213 is configured to implement a function of the controller 210. For specific implementation details on the function, refer to the foregoing function description about the controller 210.

In the backup server 130 shown in FIG. 8, the control module 213 includes a processor 214 and a memory 215. The processor 214 is connected to the first interface 211 and the second interface 212, and the processor 214 is configured to implement the function of the controller 210. The processor 214 is connected to the memory 215. The memory 215 is connected to the first interface 211 and the second interface 212. The memory 215 is configured to temporarily store information sent from the client or the object-based storage system 140. The memory 215 is further configured to store a software program and an application module. The processor 214 implements various functions of the backup server 130 by running the software program and the application module stored in the memory 215.

The processor 214 may be any computing device, and may be a general-purpose central processing unit (CPU), a microprocessor, a programmable processor, an application-specific integrated circuit (application-specific integrated circuit, ASIC), or one or more integrated circuits configured to control execution of a program in the foregoing solution. During specific implementation, in an embodiment, the processor 214 may include one or more CPUs.

The memory 215 may include a volatile memory (Volatile Memory), for example, a random-access memory (Random-Access Memory, RAM); or the memory 215 may include a non-volatile memory (non-volatile memory), for example, a read-only memory (Read-Only Memory, ROM), a flash memory (Flash Memory), a hard disk drive (Hard Disk Drive, HDD), a solid-state drive (Solid-State Drive, SSD), or a disk storage medium, but the present invention is not limited thereto.

Figure 9:
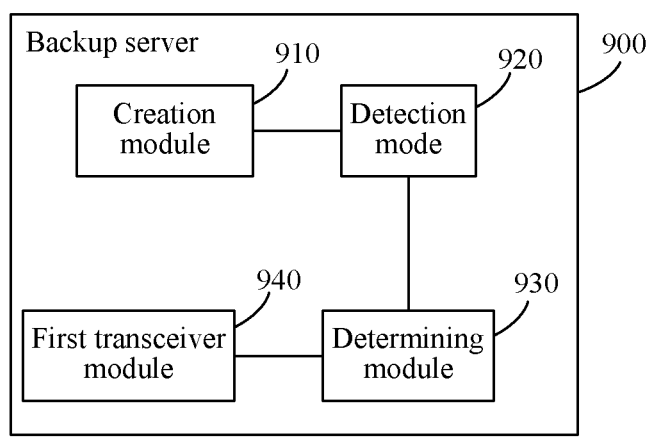
FIG. 9 is a structural diagram of another backup server according to an embodiment of the present invention.

Referring to FIG. 9, FIG. 9 is a structural diagram of another backup server according to an embodiment of the present invention. As shown in FIG. 9, the backup server 900 includes: a creation module 910, a detection module 920, a determining module 930, and a first transceiver module 940. A connection relationship between modules in the backup server 900 is as follows: The detection module 920 is separately connected to the creation module 910 and the determining module 930, and the first transceiver module 940 is connected to the determining module 930. The creation module 910, the detection module 920, and the determining module 930 may be implemented by using the controller 210 or the processor 214 shown in FIG. 8 during specific implementation. The first transceiver module 940 may be implemented by using the second interface 212 shown in FIG. 8 during specific implementation. Functions of the modules shown in FIG. 9 are described as follows:

The creation module 910 is configured to: each time after the backup server 900 determines an expired backup of first disk data, create a deletion log of the first disk data, and store a pointer of invalid data in the expired backup into the deletion log, where the expired backup is an earliest backup in all unexpired backups of the first disk data that have been performed in an object-based storage system by a current first moment. For specific implementation details that the creation module 910 creates a deletion log of the first disk data, and stores a pointer of invalid data in the expired backup into the deletion log, refer to content of steps 400 to 421 shown in FIG. 4. The specific details are not described herein again.

The detection module 920 is configured to detect whether a deletion condition is met, and if the deletion condition is met, obtain a plurality of deletion logs corresponding to the first disk data.

The determining module 930 is configured to determine, based on the plurality of deletion logs, a first target large object that is stored in the object-based storage system and that includes valid data and the invalid data. For specific implementation details that the determining module 930 determines, based on the plurality of deletion logs, a first target large object that is stored in the object-based storage system and that includes valid data and the invalid data, refer to content described in step 501 shown in FIG. 5. The specific implementation details are not described herein again.

The first transceiver module 940 is configured to send a data migration indication and an object deletion indication to the object-based storage system, where the data migration indication is used to instruct the object-based storage system to migrate the valid data in the first target large object to another large object, and the object deletion indication is used to instruct the object-based storage system to delete the first target large object. For details that the first transceiver module 940 sends a data migration indication to the object-based storage system, refer to content described in steps 510 to 540 shown in FIG. 5 or content described in steps 610 to 620 shown in FIG. 6. For specific implementation details that the first transceiver module 940 sends an object deletion indication to the object-based storage system, refer to content described in steps 550 and 560 shown in FIG. 5. The specific implementation details are not described herein again.

In an optional implementation, the detection module 920 is further configured to detect whether a quantity of the plurality of deletion logs corresponding to the first disk data reaches a preset deletion threshold, and if the preset deletion threshold is reached, determine that the deletion condition is met; or detect whether a preset deletion time is reached, and if the preset deletion time is reached, determine that the deletion condition is met; or start timing after the last time the deletion condition is met, detect whether the timing ends, and if the timing ends, determine that the deletion condition is met.

In an optional implementation, the creation module 910 is further configured to create a pointer of the valid data after being moved, create a movement log of the first disk data, and store, into the movement log, a correspondence between a pointer of the valid data before being moved and the pointer of the valid data after being moved, where the pointer of the valid data after being moved indicates a location that is in the another large object and that is of the valid data after being moved to the another large object. For details that the creation module 910 creates a pointer of the valid data after being moved, creates a movement log of the first disk data, and stores, into the movement log, a correspondence between a pointer of the valid data before being moved and the pointer of the valid data after being moved, refer to content described in steps 541 to 544 shown in FIG. 5. Specific implementation details are not described herein again.

Figure 10:
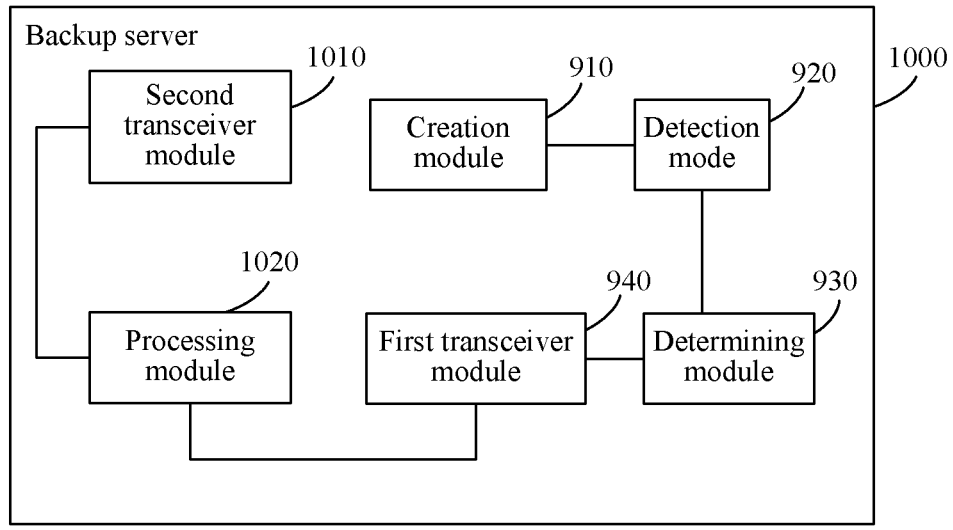
FIG. 10 is a structural diagram of another backup server according to an embodiment of the present invention.

Based on the embodiment shown in FIG. 9, in an optional implementation, referring to FIG. 10, FIG. 10 is a structural diagram of still another backup server 1000 according to an embodiment of the present invention. As shown in FIG. 10, the backup server 1000 further includes: a second transceiver module 1010 and a processing module 1020. The processing module 1020 may be implemented by using the controller 210 or the processor 214 shown in FIG. 8 during specific implementation. The second transceiver module 1010 may be implemented by using the first interface 211 shown in FIG. 8 during specific implementation. Functions of modules shown in FIG. 10 are different from those shown in FIG. 9 and are described as follows:

The second transceiver module 1010 is configured to receive a data restoration request sent by a client 110, where the data restoration request includes a first disk identifier, a second disk identifier, and a backup identifier of a to-be-restored backup, the data restoration request is used to instruct to restore the first disk data into a second disk based on the to-be-restored backup corresponding to the backup identifier of the to-be-restored backup, and the to-be-restored backup is any backup in all the unexpired backups of the first disk data. For details that the second transceiver module 1010 is configured to receive a data restoration request sent by a client, refer to content described in step 700 shown in FIG. 7A and FIG. 7B. Specific implementation details are not described herein again.

The processing module 1020 is configured to obtain backup metadata of the to-be-restored backup, and obtain each movement log of the first disk data. For details that the processing module 1020 is configured to obtain backup metadata of the to-be-restored backup, and obtain each movement log of the first disk data, refer to content described in steps 701 to 713 shown in FIG. 7A and FIG. 7B. Specific implementation details are not described herein again.

The processing module 1020 is further configured to determine, based on each movement log of the first disk data, whether a pointer the same as the pointer, recorded in the movement log, of the unmoved valid data exists in the backup metadata of the to-be-restored backup, and if the pointer exists, modify the same pointer in the backup metadata of the to-be-restored backup to the pointer of the valid data after being moved corresponding to the pointer of the valid data before being moved, to obtain modified backup metadata, where the modified backup metadata includes an unmodified pointer and a modified pointer, and the modified pointer is the pointer, recorded in the movement log, of the moved valid data. For details that an processing module 1020 obtains modified backup metadata, refer to content described in step 720 shown in FIG. 7A and FIG. 7B. Specific implementation details are not described herein again.

The first transceiver module 940 is further configured to obtain, based on the modified backup metadata, the first disk data corresponding to the to-be-restored backup. For details that the first transceiver module 940 obtains, based on the modified backup metadata, the first disk data corresponding to the to-be-restored backup, refer to content described in steps 722 to 731 shown in FIG. 7A and FIG. 7B. Specific implementation details are not described herein again.

The processing module 1020 is further configured to store the first disk data into the second disk. For details that the processing module 1020 stores the first disk data into the second disk, refer to content described in steps 740 and 750 shown in FIG. 7A and FIG. 7B. Specific implementation details are not described herein again.

Figure 11:
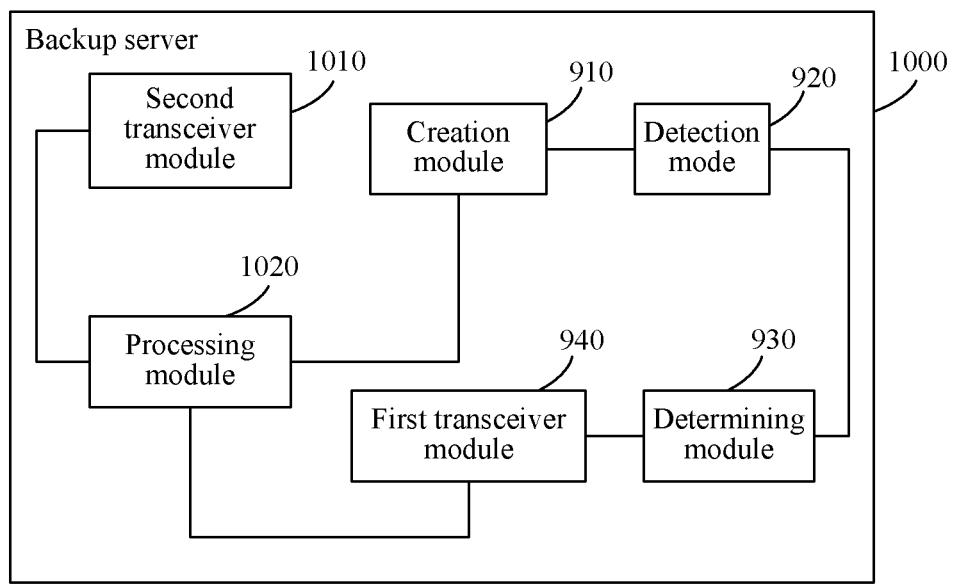
FIG. 11 is a structural diagram of another backup server according to an embodiment of the present invention.

Based on the embodiment shown in FIG. 10, in an optional embodiment, referring to FIG. 11, FIG. 11 is a structural diagram of yet another backup server according to an embodiment of the present invention. As shown in FIG. 11, the creation module 910 is connected to the processing module 1020.

The creation module 910 is further configured to create an object identifier of the movement log. For specific implementation details, refer to content described in step 543 shown in FIG. 5. The specific implementation details are not described herein again.

The processing module 1020 is further configured to store a correspondence between the first disk identifier and the object identifier of the movement log, and send a movement log storage request to the object-based storage system, where the movement log storage request includes the object identifier of the movement log and the movement log, and the movement log storage request is used to instruct the object-based storage system to store the movement log into an object corresponding to the object identifier of the movement log. For specific implementation details, refer to content described in step 543 shown in FIG. 5. The specific implementation details are not described herein again.

The processing module 1020 is further configured to obtain the object identifier of the movement log based on the first disk identifier. For specific implementation details, refer to content described in step 701 shown in FIG. 7A and FIG. 7B. The specific implementation details are not described herein again.

The first transceiver module 940 is further configured to send a movement log obtaining request, where the movement log obtaining request includes the object identifier of the movement log, and the movement log obtaining request is used to instruct the object-based storage system to obtain the movement log from the object corresponding to the object identifier of the movement log. For specific implementation details, refer to content described in step 703 shown in FIG. 7A and FIG. 7B. The specific implementation details are not described herein again.

The first transceiver module 940 is further configured to receive the movement log sent by the object-based storage system. For specific implementation details, refer to content described in steps 710 to 712 shown in FIG. 7A and FIG. 7B. The specific implementation details are not described herein again.

Figure 12:
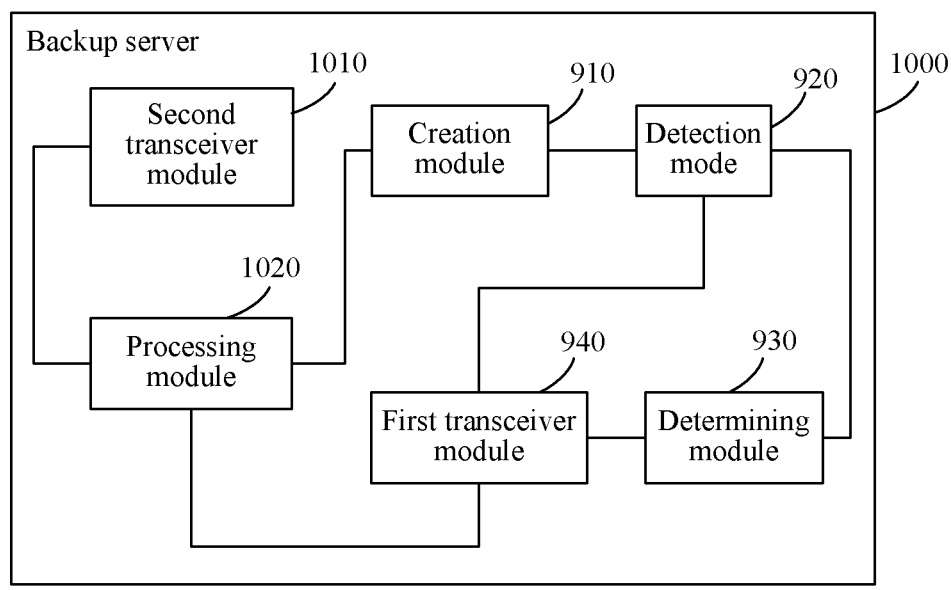
FIG. 12 is a structural diagram of another backup server according to an embodiment of the present invention.

Based on either embodiment shown in FIG. 9 or FIG. 10, in another optional embodiment, referring to FIG. 12, FIG. 12 is a structural diagram of still yet another backup server according to an embodiment of the present invention. As shown in FIG. 12, the first transceiver module 940 is connected to the detection module 920.

The determining module 930 is further configured to determine, based on the plurality of deletion logs, a first target large object that is stored in the object-based storage system and that includes invalid data, and determine a data amount of all invalid data in the first target large object based on a predefined invalid data size and a quantity of pieces of the invalid data included in the first target large object.

The first transceiver module 940 is further configured to send a data amount determining request to the object-based storage system, where the data amount determining request includes an identifier of the first target large object, and the data amount determining request is used to instruct the object-based storage system to send a data amount of the first target large object.

The first transceiver module 940 is further configured to receive data amount attribute information, where the data amount attribute information includes the data amount of the first target large object.

The detection module 920 is further configured to detect that the data amount of all the invalid data in the first target large object is less than the data amount of the first target large object in the data amount attribute information, and determine the first target large object stored in the object-based storage system as the first target large object that includes the invalid data and the valid data.

In another implementation, based on a structure of the backup server 900 shown in FIG. 9, the creation module 910 is configured to: each time after the backup server 900 determines an expired backup of first disk data, create a deletion log of the first disk data, and store a pointer of invalid data in the expired backup into the deletion log, where the expired backup is an earliest backup in all unexpired backups of the first disk data that have been performed in an object-based storage system by a current first moment. For specific implementation details that the creation module 910 creates a deletion log of the first disk data, and stores a pointer of invalid data in the expired backup into the deletion log, refer to content of steps 400 to 421 shown in FIG. 4. Specific details are not described herein again.

The detection module 920 is configured to detect whether a deletion condition is met, and if the deletion condition is met, obtain a plurality of deletion logs corresponding to the first disk data.

The determining module 930 is configured to determine, based on the plurality of deletion logs, a large object that is stored in the object-based storage system and that includes only the invalid data. For specific implementation details that the determining module 930 determines, based on the plurality of deletion logs, a large object that is stored in the object-based storage system and that includes only the invalid data, refer to content described in step 501 shown in FIG. 5. The specific implementation details are not described herein again.

The first transceiver module 940 is configured to send an object deletion indication to the object-based storage system, where the object deletion indication is used to instruct the object-based storage system to delete the large object that includes only the invalid data. For implementation details that the first transceiver module 940 sends an object deletion indication to the object-based storage system, refer to content described in steps 570 and 580 shown in FIG. 5. The specific implementation details are not described herein again.

In another implementation, the determining module 930 is further configured to determine, based on the plurality of deletion logs, a large object that includes invalid data, and determine, based on a predefined invalid data size and a quantity of pieces of the invalid data included in the large object that includes the invalid data, a data amount of all invalid data in the object that includes the invalid data.

The first transceiver module 940 is further configured to send a data amount determining request to the object-based storage system, where the data amount determining request includes an identifier of the large object that includes the invalid data, and the data amount determining request is used to instruct the object-based storage system to send a data amount of the large object that includes the invalid data.

The first transceiver module 940 is further configured to receive data amount attribute information, where the data amount attribute information includes the data amount of the large object that includes the invalid data.

The detection module 920 is further configured to detect that the data amount of all the invalid data in the large object that includes the invalid data is the same as the data amount, in the data amount attribute information, of the large object that includes the invalid data, and determine the large object that is stored in the object-based storage system and that includes the invalid data as the large object that includes only the invalid data.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

In the several embodiments provided in the present invention, it should be understood that the disclosed device, apparatus, and method may be implemented in other manners. For example, the described apparatus embodiment is merely an example. For example, the unit division is merely logical function division and may be other division in actual implementation. For example, a plurality of units or components may be combined or integrated into another device, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated module may be implemented in a form of hardware, or may be implemented in a form of hardware in addition to a software function module.

The foregoing embodiments may be all or partially implemented by software, hardware, firmware or any combination thereof. When being implemented by software, the embodiments may be all or partially implemented in the form of a computer program product. The computer program product includes one or more computer instructions. When the computer program instructions are loaded and executed on the computer, the procedures or functions according to the embodiments of the present invention are all or partially performed. The computer may be a general-purpose computer, a dedicated computer, a computer network, or another programmable apparatus. The computer instructions may be stored in a computer-readable storage medium. The computer-readable storage medium may be any usable medium that can be read by a computer, or a data storage device that includes one or more usable medium integrated servers, data centers, or the like. The usable medium may be a magnetic medium (for example, a floppy disk, a hard disk, or a tape), an optical medium (for example, a digital video disc (Digital Video Disc, DVD)), a semiconductor medium (for example, a solid state disk (Solid State Disk, SSD)), or the like.

The descriptions are only specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method, performed by a backup server computer system, for managing expired backups in an object-based storage system, the method comprising:
   determining that a deletion condition is met;
   retrieving, in response to the determining multiple deletion logs, wherein the multiple deletion logs record invalid data included in one or more expired backups;
   identifying, based on the multiple deletion logs, valid data within a first object, wherein a size of the first object is above a preset threshold;
   sending a data migration request to the object-based storage system, wherein the data migration request instructs the object-based storage system to copy the valid data of the first object into a second object, and wherein a size of the second object is above the preset threshold;
   sending an object deletion request to the object-based storage system to instruct the object-based storage system to delete the first object;
   creating, after sending the data migration request, a first metadata that is configured to record an address of the valid data in the second object;
   creating a movement log that records a mapping between the first metadata and a second metadata, wherein the second metadata is configured to record an address of the valid data in the first object;
   receiving a data restoration request for recovering the expired backup;
   retrieving the movement log; and
   restoring, based on the movement log, the expired backup.

2. The method according to claim 1, wherein the deletion condition includes a quantity of the multiple deletion logs reaching a preset deletion threshold.

3. The method according to claim 1, wherein the deletion condition includes arrival of a preset deletion period.

4. A backup server comprising:
- an interface for communicating with an object-based storage system; and
- a processor configured to:
  - determining that a deletion condition is met;
  - retrieving, in response to the determining, multiple deletion logs when a deletion condition is met, wherein the multiple deletion logs record invalid data included in one or more expired backups;
  - identifying, based on the multiple deletion logs, valid data within a first object, wherein a size of the first object is above a preset threshold;
  - sending a data migration request to the object-based storage system, wherein the data migration request instructs the object-based storage system to copy the valid data of the first object into a second object, and wherein a size of the second object is above the preset threshold; and
- sending an object deletion request to the object-based storage system to instruct the object-based storage system to delete the first object;
- creating, after sending the data migration request, a first metadata that is configured to record an address of the valid data in the second object;
- creating a movement log that records a mapping between the first metadata and a second metadata, wherein the second metadata is configured to record an address of the valid data in the first object;
- receiving a data restoration request for recovering the expired backup;
- retrieving the movement log; and
- restoring, based on the movement log, the expired backup.

5. The backup server according to claim 4, wherein the deletion condition includes a quantity of the multiple deletion logs reaching a preset deletion threshold.

6. The backup server according to claim 4, wherein the deletion condition includes arrival of a preset deletion period.

7. A non-transitory computer readable storage medium storing computer executable instructions that when executed by a processor of a backup server cause the backup server to perform operations comprising:
- determining that a deletion condition is met;
- retrieving, in response to the determining, multiple deletion logs when a deletion condition is met, wherein the multiple deletion logs record invalid data included in one or more expired backups;
- identifying, based on the multiple deletion logs, valid data within a first object, wherein a size of the first object is above a preset threshold;
- sending a data migration request to the object-based storage system, wherein the data migration request instructs the object-based storage system to copy the valid data of the first object into a second object, and wherein a size of the second object is above the preset threshold;
- sending an object deletion request to the object-based storage system to instruct the object-based storage system to delete the first object;
- creating, after sending the data migration request, a first metadata that is configured to record an address of the valid data in the second object;
- creating a movement log that records a mapping between the first metadata and a second metadata, wherein the second metadata is configured to record an address of the valid data in the first object;
- receiving a data restoration request for recovering the expired backup;
- retrieving the movement log; and
- restoring, based on the movement log, the expired backup.

8. The non-transitory computer readable storage medium according to claim 7, wherein the deletion condition includes a quantity of the multiple deletion logs reaching a preset deletion threshold.

9. The non-transitory computer readable storage medium according to claim 7, wherein the deletion condition includes arrival of preset deletion period.

* * * * *